(12) United States Patent
Sawada et al.

(10) Patent No.: US 9,561,727 B2
(45) Date of Patent: Feb. 7, 2017

(54) CONTROL SYSTEM INCLUDING A DEVICE CONFIGURED TO CHANGE A CHARGING RATE OF A BATTERY, CONTROL DEVICE, AND CONTROL METHOD OF THE SAME

(71) Applicant: Sony Corporation, Tokyo (JP)

(72) Inventors: Junichi Sawada, Tokyo (JP); Rui Kamada, Tokyo (JP); Yoshihito Ishibashi, Tokyo (JP); Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 14/352,866

(22) PCT Filed: Oct. 22, 2012

(86) PCT No.: PCT/JP2012/078080
§ 371 (c)(1),
(2) Date: Apr. 18, 2014

(87) PCT Pub. No.: WO2013/065700
PCT Pub. Date: May 10, 2013

(65) Prior Publication Data
US 2014/0285147 A1    Sep. 25, 2014

(51) Int. Cl.
*B60L 11/18* (2006.01)
*H02J 7/00* (2006.01)

(52) U.S. Cl.
CPC ............ *B60L 11/1811* (2013.01); *H02J 7/007* (2013.01); *H02J 7/0055* (2013.01)

(58) Field of Classification Search
CPC ....... B60L 11/1811; H02J 7/007; H02J 7/0055
See application file for complete search history.

(56) References Cited

U.S. PATENT DOCUMENTS

| | | | | |
|---|---|---|---|---|
| 5,225,712 A | * | 7/1993 | Erdman | F03D 7/0272 290/44 |
| 5,703,468 A | * | 12/1997 | Petrillo | H01M 10/44 320/101 |
| 5,886,890 A | * | 3/1999 | Ishida | H02J 3/38 363/71 |
| 6,628,011 B2 | * | 9/2003 | Droppo | H02J 7/34 307/43 |
| 6,794,846 B2 | * | 9/2004 | Tsuji | B60L 11/1868 320/103 |

(Continued)

FOREIGN PATENT DOCUMENTS

| | | |
|---|---|---|
| DE | 102 17 561 | 11/2002 |
| JP | 2007-221958 | 8/2007 |

(Continued)

OTHER PUBLICATIONS

Office Action issue in connection with Japanese Patent Application No. 2011-241135, dated Jun. 2, 2015. (4 pages).

*Primary Examiner* — Naum B Levin
(74) *Attorney, Agent, or Firm* — K&L Gates LLP

(57) ABSTRACT

A control system includes a first device configured to receive a first voltage, and convert the first voltage to a second voltage that varies according to a variation of the received first voltage. The control system also includes a second device configured to receive the second voltage and to change a charging rate of an energy storage device according to a variation of the received second voltage.

14 Claims, 11 Drawing Sheets

(56) References Cited

U.S. PATENT DOCUMENTS

| | | | | |
|---|---|---|---|---|
| 7,411,371 B2* | 8/2008 | Hobbs | | B60L 3/0046 |
| | | | | 320/128 |
| 7,545,120 B2* | 6/2009 | Breen | | H02J 7/022 |
| | | | | 320/111 |
| 7,745,025 B2* | 6/2010 | Leach | | H02J 7/0018 |
| | | | | 320/101 |
| 8,841,879 B2* | 9/2014 | Belz | | H02J 7/00 |
| | | | | 320/106 |
| 9,124,191 B2* | 9/2015 | Ishibashi | | H02M 1/36 |
| 9,225,174 B2* | 12/2015 | Ishibashi | | H02J 3/382 |
| 9,225,199 B2* | 12/2015 | Teggatz | | H02J 7/35 |
| 2003/0002305 A1 | 1/2003 | Takeuchi | | |
| 2005/0164075 A1* | 7/2005 | Kumamoto | | H01M 8/04186 |
| | | | | 429/50 |
| 2007/0190369 A1* | 8/2007 | Leach | | H02J 7/0018 |
| | | | | 429/9 |
| 2009/0079394 A1* | 3/2009 | Richards | | H02J 7/0055 |
| | | | | 320/134 |
| 2009/0266397 A1* | 10/2009 | Gibson | | H02S 40/38 |
| | | | | 136/244 |
| 2010/0026100 A1* | 2/2010 | Teggatz | | H02J 7/0055 |
| | | | | 307/82 |
| 2011/0215770 A1* | 9/2011 | Belz | | H02J 7/00 |
| | | | | 320/160 |
| 2011/0234150 A1* | 9/2011 | Furukawa | | H02J 7/0027 |
| | | | | 320/101 |
| 2012/0293021 A1* | 11/2012 | Teggatz | | H02J 7/35 |
| | | | | 307/151 |
| 2013/0049471 A1* | 2/2013 | Oleynik | | H02J 3/01 |
| | | | | 307/65 |
| 2013/0113436 A1* | 5/2013 | Ishibashi | | H02J 7/0013 |
| | | | | 320/136 |

FOREIGN PATENT DOCUMENTS

| | | |
|---|---|---|
| JP | 2008-083022 | 4/2008 |
| JP | 2009-017686 | 1/2009 |
| JP | 2009-207239 | 9/2009 |
| JP | 2011-097817 | 5/2011 |
| WO | 2008/117217 | 10/2008 |

\* cited by examiner

CONTROL SYSTEM INCLUDING A DEVICE CONFIGURED TO CHANGE A CHARGING RATE OF A BATTERY, CONTROL DEVICE, AND CONTROL METHOD OF THE SAME

CROSS REFERENCES TO RELATED APPLICATIONS

The present application is a national stage of International Application No. PCT/JP2012/078080 filed on Oct. 22, 2012 and claims priority to Japanese Patent Application No. 2011-241135 filed on Nov. 2, 2011, the disclosure of which is incorporated herein by reference.

BACKGROUND

The present disclosure relates to a control system, a control device, and a control method for changing a rate of charging of a battery, for example.

Secondary batteries typified by lithium-ion batteries have spread widely. The following Patent Document 1 describes a system that allows a user to select a normal charging rate at which to charge a secondary battery or a high charging rate at which to charge the secondary battery.

PRIOR ART DOCUMENT

Patent Document

Patent Document 1: Japanese Patent Laid-Open No. 2008-083022

SUMMARY

Technical Problem

A technology described in Patent Document 1 changes the charging rate according to an operation by the user. When power that can be supplied changes due to a change in weather or the like as in photovoltaic power generation, for example, the charging rate cannot be changed according to a change in the power that can be supplied.

It is accordingly an object of the present disclosure to provide a control system, a control device, and a control method that change the charging rate according to variation in voltage generated by a power generating section for photovoltaic power generation or the like.

Technical Solution

In order to solve the above problems, according to the present disclosure, for example, there is provided a control system including:
a first device configured to receive a first voltage, and convert the first voltage to a second voltage that varies according to a variation of the received first voltage; and a second device configured to receive the second voltage and to change a charging rate of an energy storage device according to a variation of the received second voltage.

In another embodiment, there is provided a method of charging an energy storage device. The method includes: receiving a first voltage; converting the first voltage to a second voltage that varies according to a variation of the received first voltage; changing a charging rate of an energy storage device according to a variation of the received second voltage.

In another embodiment, a charging unit is provided and includes a device configured to receive a voltage, and to change a charging rate of an energy storage device according to a variation of the received voltage supplied to the device.

In another embodiment, a method of charging an energy storage device is provided. The method includes receiving a voltage, and changing a charging rate of the energy storage device according to a variation of the received voltage.

In another embodiment, an electric vehicle is provided and includes: a first control system including a first device configured to receive a first voltage, and convert the first voltage to a second voltage that varies according to a variation of the received first voltage, and a second device configured to receive the second voltage and to change a charging rate of an energy storage device according to a variation of the received second voltage. The electric vehicle also includes a conversion apparatus that converts power supplied from the energy storage device into a form usable by a component of the electric vehicle, and a second control system configured to process information relating to vehicle control on the basis of information relating to the energy storage device.

In another embodiment, an electric vehicle is provided and includes: a charging unit including a device configured to receive a voltage, and to change a charging rate of an energy storage device according to a variation of the received voltage supplied to the device; a conversion apparatus that converts power supplied from the energy storage device into a form usable by a component of the electric vehicle; and a second control system configured to process information relating to vehicle control on the basis of information relating to the energy storage device.

Advantageous Effect

According to at least one embodiment, it is possible to change a rate of charging of a battery according to variation in voltage supplied from a power generating section.

Additional features and advantages are described herein, and will be apparent from the following Detailed Description and the figures.

DETAILED DESCRIPTION

An embodiment of the present disclosure will hereinafter be described with reference to the drawings. Incidentally, description will be made in the following order.
<1. Embodiment>
<2. Example of Modification>
It is to be noted that an embodiment and an example of modification to be described in the following are preferred concrete examples of the present disclosure, and that there is no limitation to the embodiment and the example of modification.

1. Embodiment

Configuration of System

Figure 1:
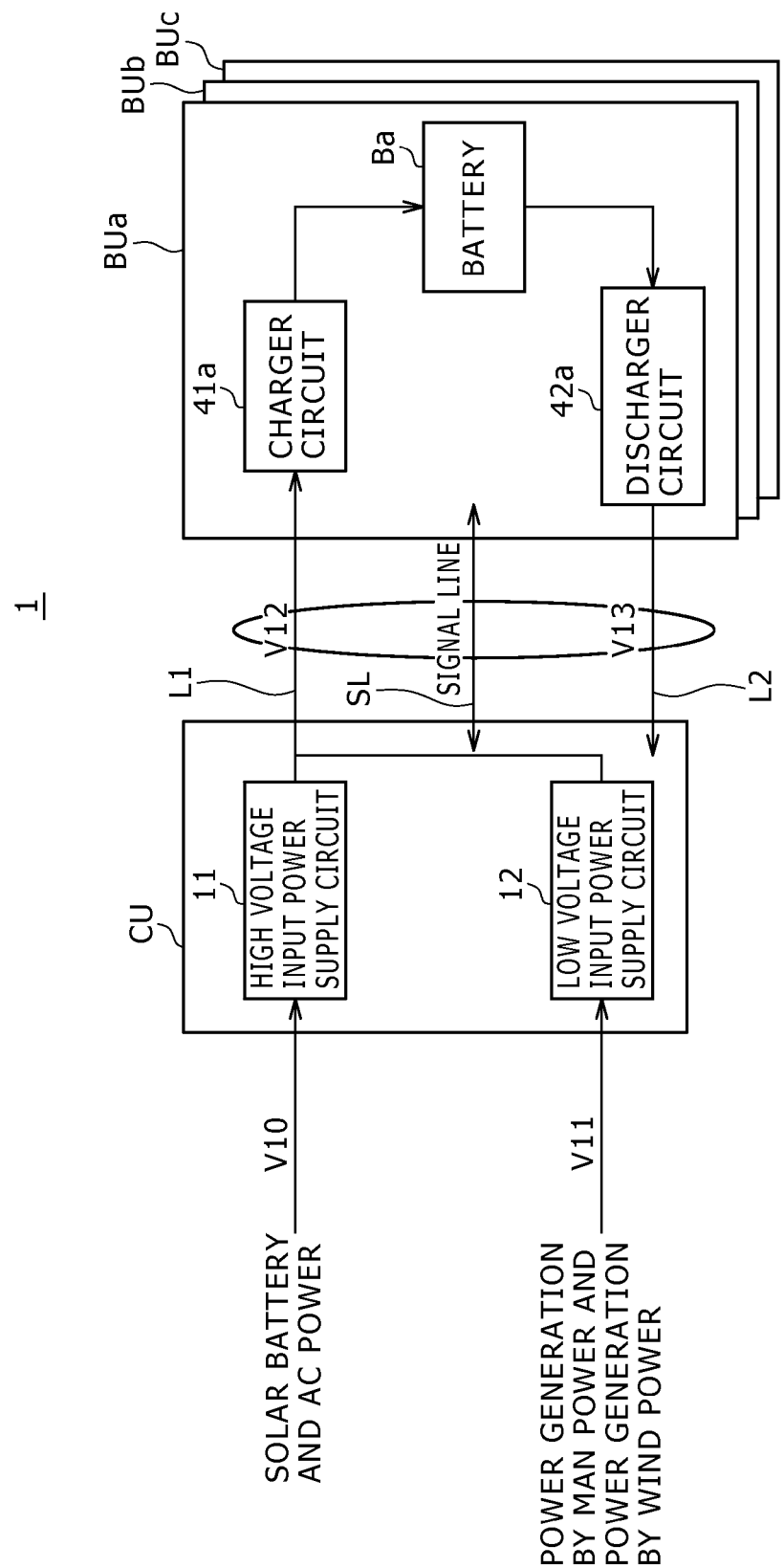
FIG. 1 is a block diagram showing an example of configuration of a system.

FIG. 1 shows an example of configuration of a control system in the present disclosure. The control system includes one or a plurality of control units CU and one or a plurality of battery units BU. The control system 1 illustrated in FIG. 1 includes one control unit CU and three battery units BUa, BUb, and BUc. In the following description, the individual battery units will be referred to as a battery unit BU as appropriate when the individual battery units do not need to be distinguished from each other.

The control system 1 can control the plurality of battery units BU independently. Further, the plurality of battery units BU can be connected to the control system 1 independently of each other. For example, in a state of the battery unit BUa and the battery unit BUb being connected to the control system 1, the battery unit BUc can be newly connected to the control system 1. In a state of the battery units BUa to BUc being connected to the control system 1, only the battery unit BUb can be detached from the control system 1.

The control unit CU and the battery units BU are connected to each other by power lines. The power lines include for example a power line L1 for transmitting power from the control unit CU to the battery units BU and a power line L2 for transmitting power from the battery units BU to the control unit CU. Two-way communication is performed between the control unit CU and each of the battery units BU via a signal line SL. The communication complying with specifications such for example as SMBus (System Management Bus) or UART (Universal Asynchronous Receiver-Transmitter) is performed.

The signal line SL is formed by one or a plurality of lines, and the line to be used is defined according to a use. The signal line SL is made common, and each of the battery units BU is connected to the signal line SL. Each of the battery units BU analyzes the header section of a control signal transmitted via the signal line SL to determine whether the control signal is directed to the battery unit itself. A command can be transmitted to a battery unit BU by setting the level or the like of the control signal appropriately. A response from a battery unit BU to the control unit CU is transmitted also to the other battery units BU. However, the other battery units BU do not operate according to the response transmitted. Incidentally, while description of the present example will be made supposing that the transmission of power and communication are performed by wire, the transmission of power and communication may also be performed by radio.

[Outline of Configuration of Control Unit]

The control unit CU includes a high voltage input power supply circuit 11 and a low voltage input power supply circuit 12. The control unit CU has one or a plurality of first devices. In the present example, the control unit CU has two first devices, and the high voltage input power supply circuit 11 and the low voltage input power supply circuit 12 correspond to the first devices, respectively. Incidentally, while the expressions of high voltage and low voltage are used, voltages input to the high voltage input power supply circuit 11 and the low voltage input power supply circuit 12 may be in a same input range. No problem is presented even when the input ranges of the voltages acceptable by the high voltage input power supply circuit 11 and the low voltage input power supply circuit 12 overlap each other.

The high voltage input power supply circuit 11 and the low voltage input power supply circuit 12 are supplied with a voltage generated by a power generating section that generates power according to an environment. For example, the power generating section is a device that generates power by solar light or wind power. On the other hand, the power generating section is not limited to a device that generates power according to a natural environment. For example, the power generating section may be configured as a device that generates power by man power. While a power generating device whose power generation energy thus varies according to an environment or conditions is assumed, devices whose power generation energy do not vary can also be accepted. Therefore, as shown in the figure, AC power is also input. Incidentally, the high voltage input power supply circuit 11 and the low voltage input power supply circuit 12 are supplied with voltage from a same power generating section or different power generating sections. The voltage generated by the power generating section is an example of a first voltage.

The high voltage input power supply circuit 11 is for example supplied with a DC (Direct Current) voltage (V10) of about 75 V (volts) to 100 V which voltage is generated by photovoltaic power generation. The high voltage input power supply circuit 11 may be supplied with an AC (Alternating Current) voltage of about 100 V to 250 V. The high voltage input power supply circuit 11 generates a second voltage according to variation in the voltage V10 supplied from the photovoltaic power generation. For example, the high voltage input power supply circuit 11 lowers the voltage V10, thereby generating the second voltage. The second voltage is for example a DC voltage in a range of 45 to 48 V.

The high voltage input power supply circuit 11 converts the voltage V10 to 45 V when the voltage V10 is 75 V. The high voltage input power supply circuit 11 converts the voltage V10 to 48 V when the voltage V10 is 100 V. The high voltage input power supply circuit 11 generates the second voltage while changing the second voltage substantially linearly in the range of 45 V to 48 V as the voltage V10 changes in a range of 75 V to 100 V. The high voltage input power supply circuit 11 outputs the generated second voltage. Incidentally, the output of various kinds of feedback circuits may be used as it is without the rate of the change being set linear.

The low voltage input power supply circuit 12 is for example supplied with a DC voltage (V11) in a range of about 10 V to 40 V which voltage is generated by wind power generation or by man power. As with the high voltage input power supply circuit 11, the low voltage input power supply circuit 12 generates a second voltage according to variation in the voltage V11. The low voltage input power supply circuit 12 raises the voltage V11 to a DC voltage in a range of 45 V to 48 V, for example, as the voltage V11 changes in the range of about 10 V to 40 V. The raised DC voltage is output from the low voltage input power supply circuit 12.

Both or one of the output voltages from the high voltage input power supply circuit 11 and the low voltage input power supply circuit 12 is supplied to the battery units BU. In the figure, the DC voltage supplied to the battery units BU is shown as V12. As described above, the voltage V12 is for example a DC voltage in the range of 45 V to 48 V. All or a part of the plurality of battery units BU are charged by the voltage V12. Incidentally, a battery unit BU that is discharging is not charged.

A personal computer may be able to be connected to the control unit CU. The control unit CU and the personal computer are connected to each other by a USB (Universal Serial Bus), for example. The personal computer may be used to control the control unit CU.

[Outline of Configuration of Battery Unit]

Description will be made of an outline of a configuration of a battery unit as an example of a second device. The following description will be made by taking the battery unit BUa as an example. However, the battery unit BUb and the battery unit BUc have the same configuration unless otherwise specified.

The battery unit BUa includes a charger (charging) circuit 41a, a discharger (discharging) circuit 42a, and a battery Ba. The other battery units BU similarly include a charger (charging) circuit, a discharger (discharging) circuit, and a battery. In the following description, the individual batteries will be referred to as a battery B as appropriate when the individual batteries do not need to be distinguished from each other.

The charger circuit 41a converts the voltage V12 supplied from the control unit CU to a voltage adapted to the battery Ba. The battery Ba is charged on the basis of the converted voltage. Incidentally, the charger circuit 41a changes a rate of charging of the battery Ba according to variation in the voltage V12.

Power output from the battery Ba is supplied to the discharger circuit 42a. A DC voltage in a range of about 12 to 55 V, for example, is output from the battery Ba. The discharger circuit 42a converts the DC voltage supplied from the battery Ba into a DC voltage V13. The voltage V13 is for example a DC voltage of 48 V. The voltage V13 is output from the discharger circuit 42a to the control unit CU via a power line L3. Incidentally, the DC voltage output from the battery Ba may be supplied directly to an external device without being passed through the discharger circuit 42a.

The battery B is a lithium-ion battery, an olivine-type iron phosphate lithium-ion battery, a lead battery, or the like. The batteries B of the respective battery units BU may be different batteries. For example, the battery Ba of the battery unit BUa and the battery Bb of the battery unit BUb are formed by a lithium-ion battery. The battery Bc of the battery unit BUc is formed by a lead battery. The number and mode of connection of battery cells in the battery B can be changed as appropriate. A plurality of battery cells may be connected in series with each other or in parallel with each other. Series connections of a plurality of battery cells may be connected in parallel with each other.

When a plurality of battery units are discharging at a light load, a highest output voltage is supplied as the voltage V13 to the power line L2. As the load becomes heavier, the outputs from a plurality of battery units are combined with each other, and the combined output is supplied to the power line L2. The voltage V13 is supplied to the control unit CU via the power line L2. The voltage V13 is output from the output port of the control unit CU. The control unit CU can be supplied with power from a plurality of battery units BU in a distributed manner. Therefore a load on each of the battery units BU can be reduced.

The following form of use, for example, can be considered. The voltage V13 output from the battery unit BUa is supplied to an external device via the control unit CU. The battery unit BUb is supplied with the voltage V12 from the control unit CU, so that the battery Bb of the battery unit BUb is charged. The battery unit BUc is used as an auxiliary power supply. For example, when an amount of charge remaining in the battery unit BUa is reduced, a battery unit to be used is changed from the battery unit BUa to the battery unit BUc. The voltage V13 output from the battery unit BUc is supplied to the external device. Of course, the above-described form of use is an example, and there is no limitation to this.

[Internal Configuration of Control Unit]

Figure 2:
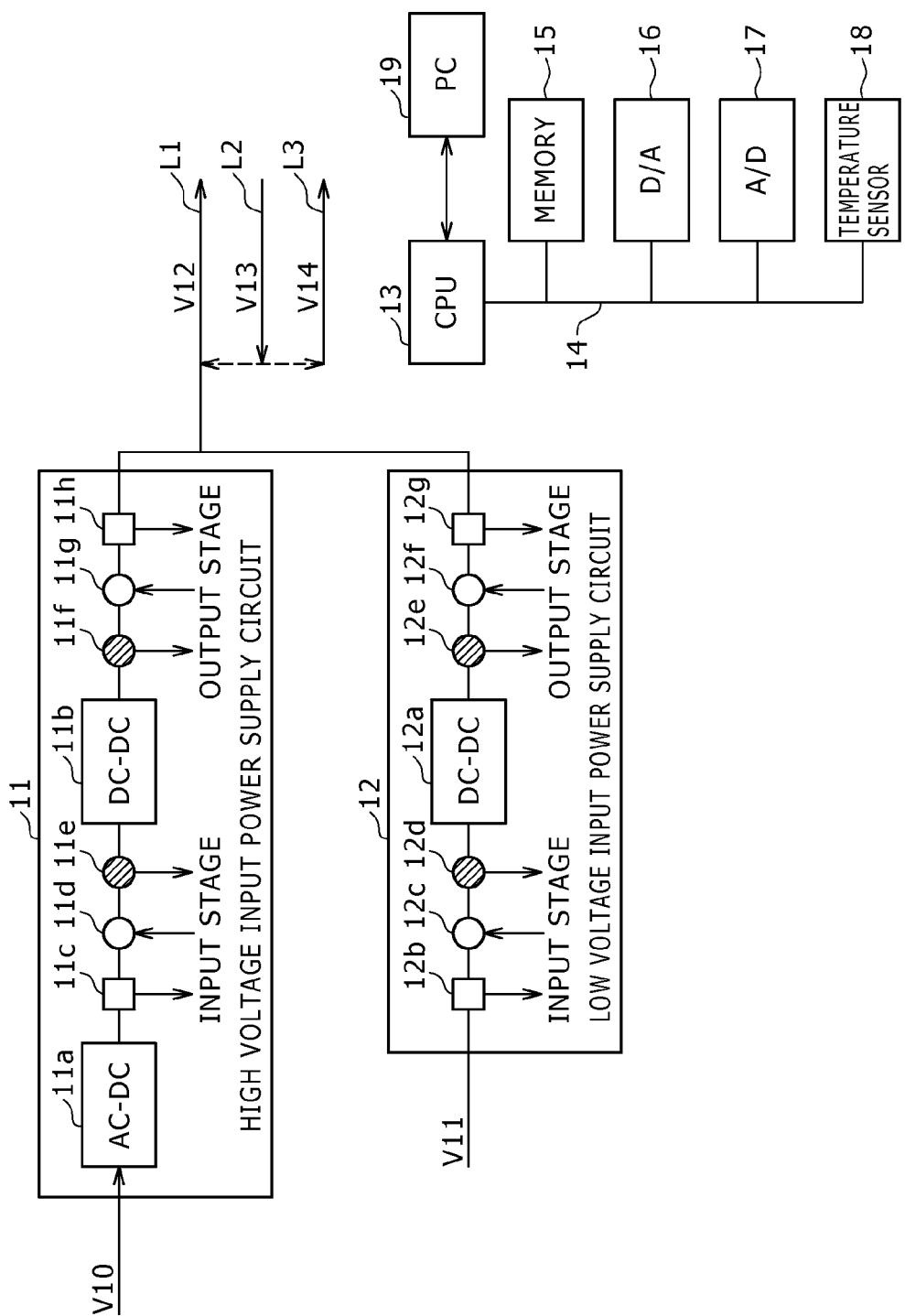
FIG. 2 is a block diagram showing an example of configuration of a control unit.

FIG. 2 shows an example of an internal configuration of the control unit CU. As described above, the control unit CU includes the high voltage input power supply circuit 11 and the low voltage input power supply circuit 12. The high voltage input power supply circuit 11 includes an AC-DC converter 11a for converting AC input to DC output and a DC-DC converter 11b for lowering the voltage V10 to a DC voltage in the range of 45 V to 48 V. Publicly known systems can be applied to the systems of the AC-DC converter 11a and the DC-DC converter 11b. Incidentally, when only DC voltage is supplied to the high voltage input power supply circuit 11, the AC-DC converter 11a may not be provided.

Figure 5:
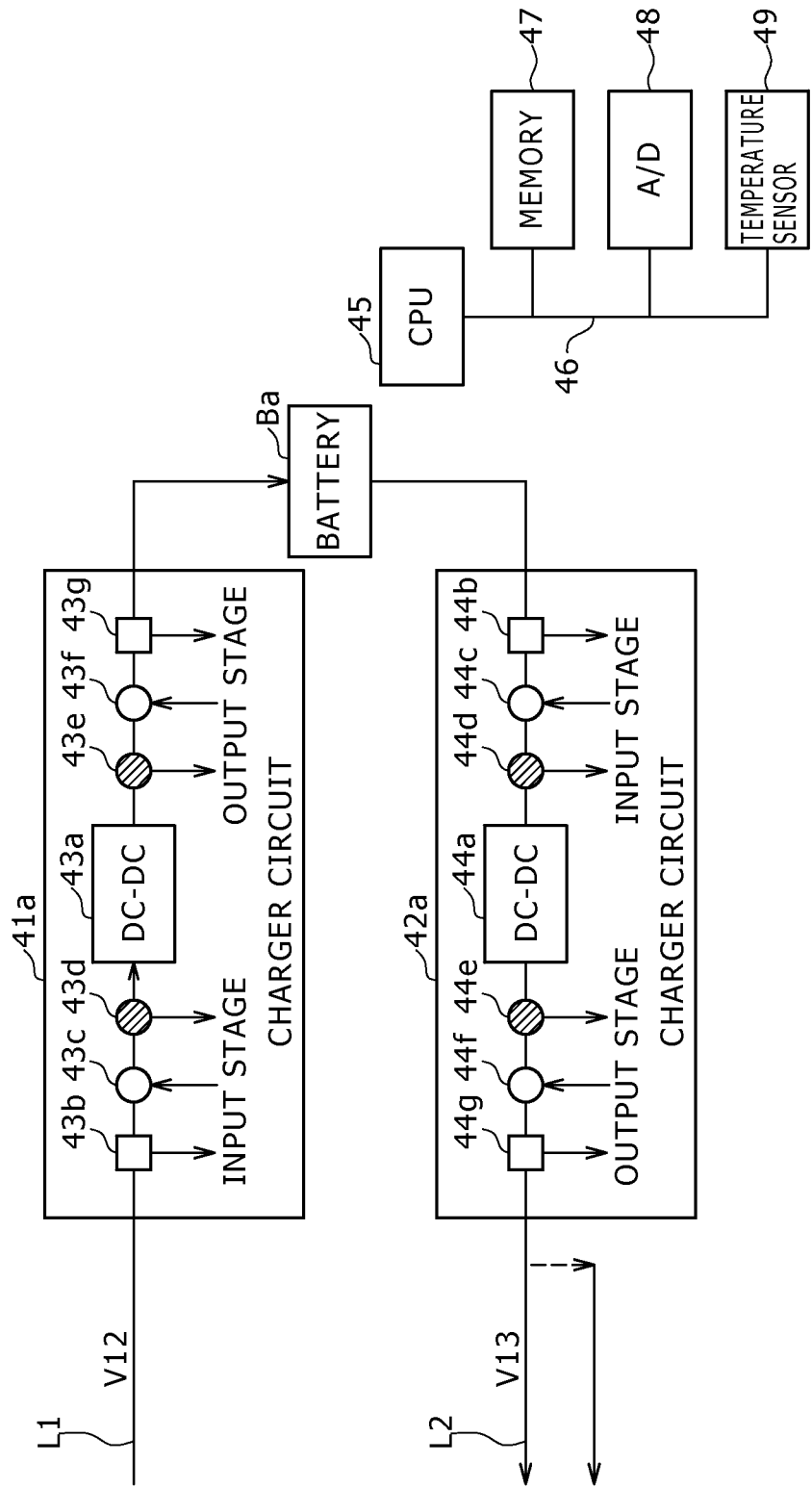
FIG. 5 is a block diagram showing an example of configuration of a battery unit.

A voltage sensor, an electronic switch, and a current sensor are connected to each of the input stage and the output stage of the DC-DC converter 11b. In FIG. 2 and FIG. 5 to be described later, a voltage sensor is simplified and represented by a square, an electronic switch is simplified and represented by a circle, and a current sensor is simplified and represented by a hatched circle. A voltage sensor 11c, an electronic switch 11d, and a current sensor 11e are connected to the input stage of the DC-DC converter 11b. A current sensor 11f, an electronic switch 11g, and a voltage sensor 11h are connected to the output stage of the DC-DC converter 11b. Sensor information obtained by each of the sensors is supplied to a CPU (Central Processing Unit) 13 to be described later. The CPU 13 performs on/off control of each of the electronic switches.

The low voltage input power supply circuit 12 includes a DC-DC converter 12a for raising the voltage V11 to a DC voltage in the range of 45 V to 48 V. A voltage sensor, an electronic switch, and a current sensor are connected to each of the input stage and the output stage of the low voltage input power supply circuit 12. A voltage sensor 12b, an electronic switch 12c, and a current sensor 12d are connected to the input stage of the DC-DC converter 12a. A current sensor 12e, an electronic switch 12f, and a voltage sensor 12g are connected to the output stage of the DC-DC converter 12a. Sensor information obtained by each of the sensors is supplied to the CPU 13 to be described later. The CPU 13 performs on/off control of each of the switches.

Incidentally, arrows extending from the sensors in the figure indicate that the sensor information is supplied to the CPU 13. Arrows directed to the electronic switches indicate that the electronic switches are controlled by the CPU 13.

The output voltage of the high voltage input power supply circuit 11 is output via a diode. The output voltage of the low voltage input power supply circuit 12 is output via a diode. The output voltage of the high voltage input power supply circuit 11 and the output voltage of the low voltage input power supply circuit 12 are combined, and the combined voltage V12 is output to the battery units BU via the power line L1. The voltage V13 supplied from the battery units BU is supplied to the control unit CU via the power line L2. Next, the voltage V13 supplied to the control unit CU is supplied to the external device via a power line L3. Incidentally, in the figure, the voltage supplied to the external device is shown as a voltage V14.

The power line L3 may be connected to the battery units BU. With such a configuration, for example, power output from the battery unit BUa is supplied to the control unit CU via the power line L2. The supplied power is supplied to the battery unit BUb via the power line L3, so that the battery unit BUb can be charged. Incidentally, though not shown in the figure, power supplied to the control unit CU via the power line L2 may be supplied to the power line L1.

The control unit CU includes the CPU 13. The CPU 13 controls various parts of the control unit CU. For example, the CPU 13 turns on/off the electronic switches in the high voltage input power supply circuit 11 and the low voltage input power supply circuit 12. Further, the CPU 13 supplies a control signal to each of the battery units BU. The CPU 13 for example supplies the battery units BU with a control signal for turning on power to the battery units BU and a control signal as an instruction for charging or discharging. The CPU 13 can output control signals of different contents to the respective battery units BU.

The CPU 13 is connected to a memory 15, a D/A (Digital to Analog) converting section 16, an A/D (Analog to Digital) converting section 17, and a temperature sensor 18 via a bus 14. The bus 14 is formed by an I$^2$C bus, for example. The memory 15 is formed by a nonvolatile memory such as an EEPROM (Electrically Erasable and Programmable Read Only Memory) or the like. The D/A converting section 16 converts digital signals used in various kinds of processing into analog signals.

The sensor information measured by the voltage sensors and the current sensors is input to the CPU 13. The sensor information is converted into a digital signal by the A/D converting section 17, and then input to the CPU 13. The temperature sensor 18 measures ambient temperatures. For example, the temperature sensor 18 measures a temperature inside the control unit CU and a temperature on the periphery of the control unit CU.

The CPU 13 may have a communicating function. For example, communications may be exchanged between the CPU 13 and a personal computer (PC) 19. Without being limited to the personal computer, communication may be performed between a device connected to a network such as the Internet and the like and the CPU 13.

[Power Supply System of Control Unit]

Figure 3:
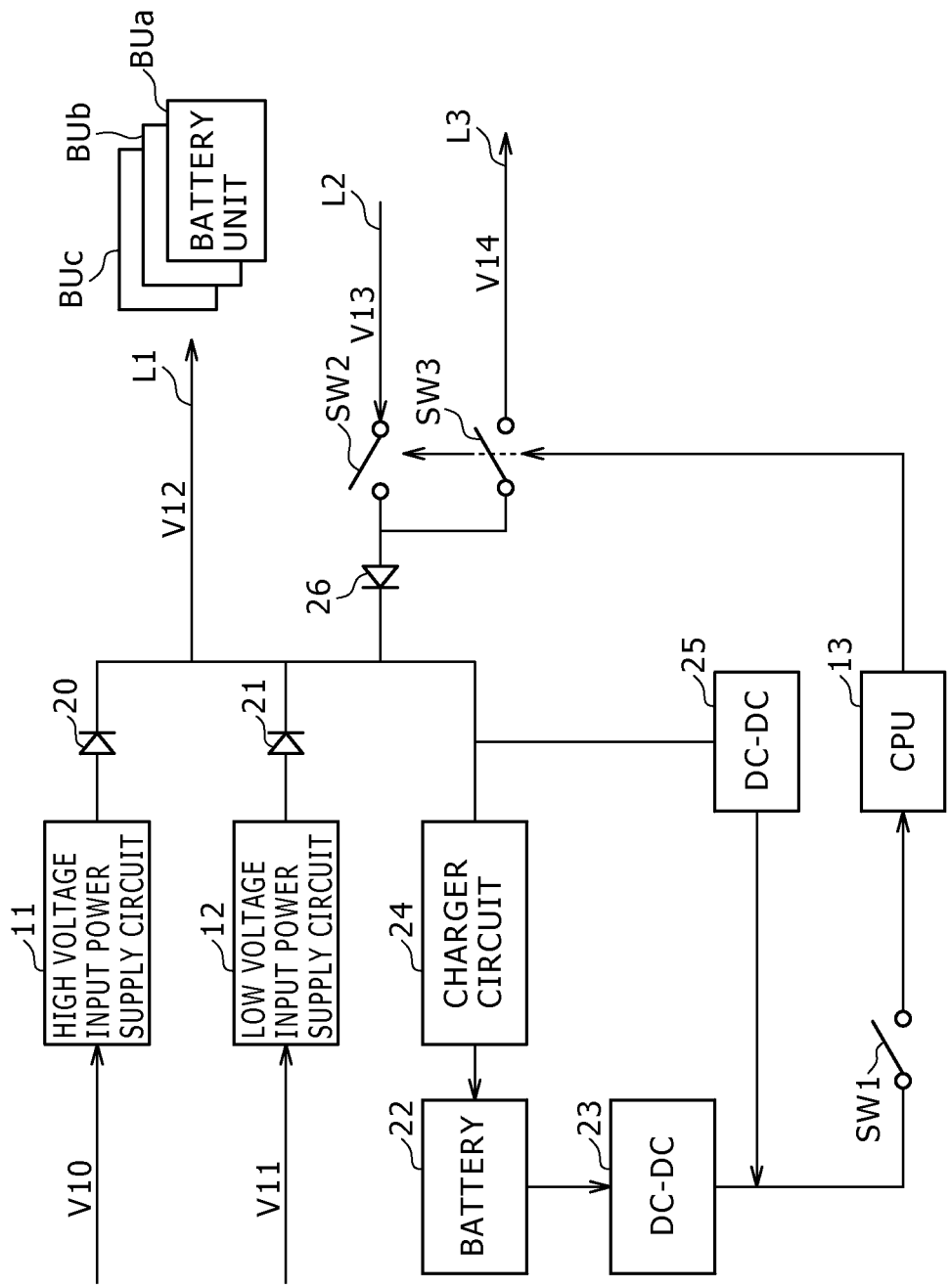
FIG. 3 is a block diagram showing an example of configuration of a power supply system of the control unit.

FIG. 3 shows an example of a configuration of the control unit CU which configuration relates mainly to a power supply system. The output stage of the high voltage input power supply circuit 11 is connected with a diode 20 for preventing a reverse current. The output stage of the low voltage input power supply circuit 12 is connected with a diode 21 for preventing a reverse current. The diode 20 and the diode 21 establish an OR connection of the high voltage input power supply circuit 11 and the low voltage input power supply circuit 12. The outputs of the high voltage input power supply circuit 11 and the low voltage input power supply circuit 12 are combined and then supplied to the battery units BU. In actuality, one of the outputs of the high voltage input power supply circuit 11 and the low voltage input power supply circuit 12 which output is the higher voltage is supplied to the battery units BU. However, there also occur conditions in which power is supplied from both of the high voltage input power supply circuit 11 and the low voltage input power supply circuit 12 according to an amount of power consumed by the battery units BU as a load.

The control unit CU is provided with a main switch SW1 operable by a user. Turning on the main switch SW1 supplies power to the CPU 13, and activates the control unit CU. The CPU 13 is for example supplied with power from a battery 22 built in the control unit CU. The battery 22 is a rechargeable battery such as a lithium-ion battery or the like. A DC-DC converter 23 converts a DC voltage from the battery 22 into a voltage for operating the CPU 13. The converted voltage is supplied as a power supply voltage to the CPU 13. The battery 22 is thus used at the time of activation of the control unit CU. The battery 22 is controlled by the CPU 13, for example.

The battery 22 can be charged by power supplied from the high voltage input power supply circuit 11 and the low voltage input power supply circuit 12 or the battery units BU. The power supplied from the battery units BU is supplied to a charger circuit 24. The charger circuit 24 includes a DC-DC converter. The charger circuit 24 converts the voltage V13 supplied from the battery units BU to a DC voltage at a predetermined level. The converted DC voltage is supplied to the battery 22. The battery 22 is charged by the supplied DC voltage.

Incidentally, the CPU 13 may operate on the high voltage input power supply circuit 11 and the low voltage input power supply circuit 12 or the voltage V13 supplied from the battery units BU. A DC-DC converter 25 converts the voltage V13 supplied from the battery units BU to a voltage at a predetermined level. The converted voltage is supplied as a power supply voltage to the CPU 13, so that the CPU 13 operates.

When at least one of V10 and V11 is input after the activation of the control unit CU, the voltage V12 is generated. The voltage V12 is supplied to the battery units BU via the power line L1. At this time, the CPU 13 communicates with the battery units BU using the signal line SL. By this communication, the CPU 13 outputs a control signal as an instruction for activation and discharging to the battery units BU. The CPU 13 then turns on a switch SW2. The switch SW2 is for example formed by a FET (Field Effect Transistor). The switch SW2 may also be formed by an IGBT (Insulated Gate Bipolar Transistor). When the switch SW2 is turned on, the voltage V13 is supplied from the battery units BU to the control unit CU.

A diode 26 for preventing a reverse current is connected to the output side of the switch SW2. The connection of the diode 26 can prevent unstable power supplied from a solar battery, wind power generation, and the like from being supplied directly to the external device. The external device can be supplied with stable power supplied from the battery units BU. Of course, a diode may also be provided to the final stage of the battery units BU for safety.

When the power supplied from the battery units BU is supplied to the external device, the CPU 13 turns on a switch SW3. When the switch SW3 is turned on, a voltage V14 based on the voltage V13 is supplied to the external device via the power line L3. Incidentally, the voltage V14 may be supplied to another battery unit BU, and the battery B of the battery unit BU may be charged by the voltage V14.

[Example of Configuration of High Voltage Input Power Supply Circuit]

Figure 4:
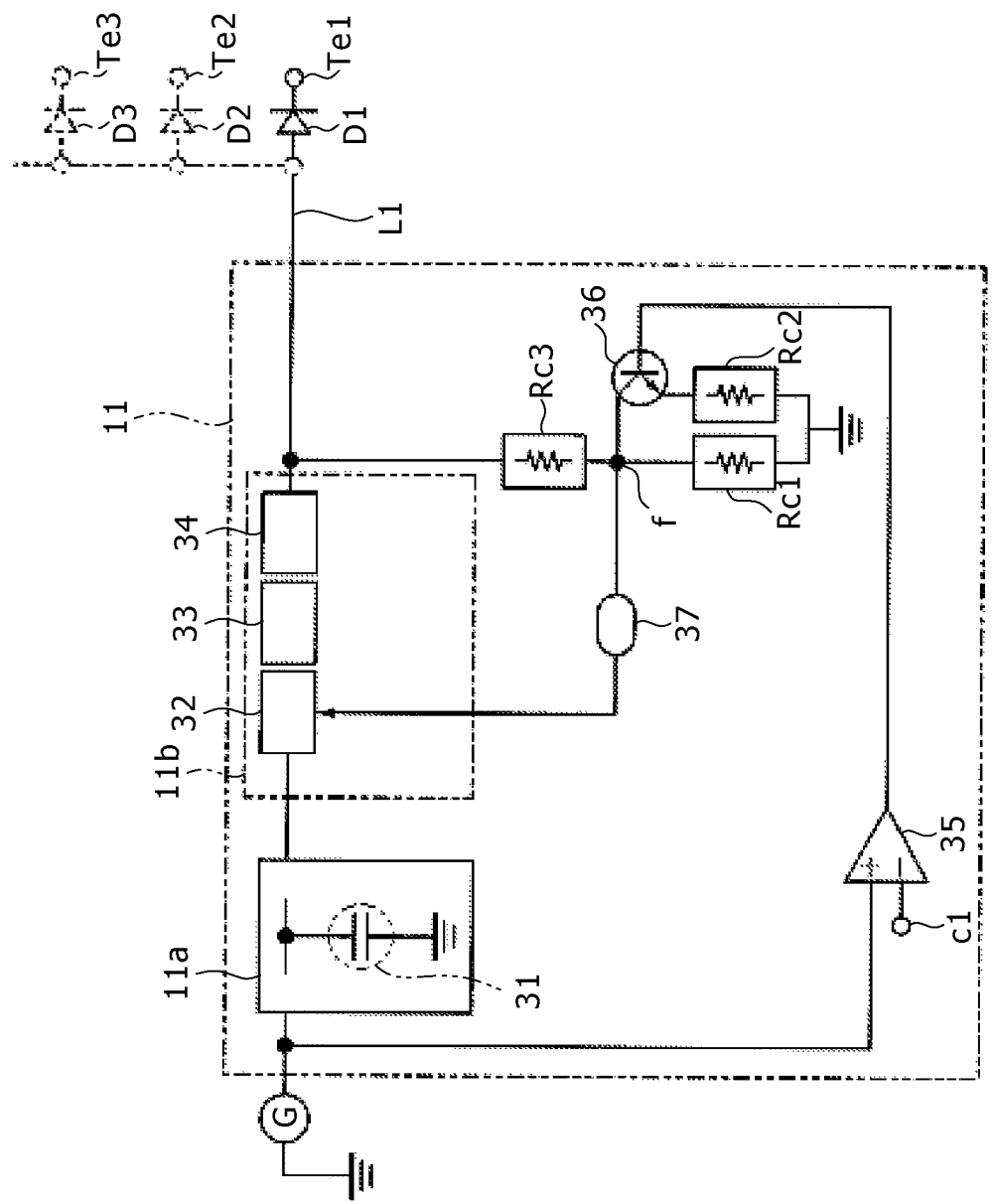
FIG. 4 shows a concrete example of configuration of a high voltage input power supply circuit in the control unit.

FIG. 4 shows a concrete example of configuration of the high voltage input power supply circuit. As shown in FIG. 4, the high voltage input power supply circuit 11 includes the DC-DC converter 11b and a feedforward control system to be described later. FIG. 4 does not show the voltage sensor 11c, the electronic switch 11d, the current sensor 11e, the current sensor 11f, the electronic switch 11g, the voltage sensor 11h, the diode 20, or the like.

The diagrammatic representation and description of the low voltage input power supply circuit 12 will be omitted because the low voltage input power supply circuit 12 has a substantially similar configuration to that of the high voltage input power supply circuit 11 except that the DC-DC converter 12a is a step-up type DC-DC converter.

The DC-DC converter 11b includes for example a primary side circuit 32 including a switching element and the like, a transformer 33, and a secondary side circuit 34 including a rectifying element and the like. The DC-DC converter 11b illustrated in FIG. 4 is a converter of a current resonance type (LLC resonant converter).

The feedforward control system includes an operational amplifier 35, a transistor 36, and resistances Rc1, Rc2, and Rc3. The output of the feedforward control system is for example input to a control terminal provided to the driver of the primary side circuit 32 in the DC-DC converter 11b. The DC-DC converter 11b adjusts the output voltage from the high voltage input power supply circuit 11 such that an input voltage to the control terminal is constant.

Because the high voltage input power supply circuit 11 has a feedforward control system, the value of the output voltage from the high voltage input power supply circuit 11 is adjusted to be a voltage value within a range set in advance. Therefore the control unit CU including the high voltage input power supply circuit 11 for example has a function of a voltage converting circuit for changing the output voltage according to changes in the input voltage from the solar battery and the like.

As shown in FIG. 4, the output voltage is extracted from the high voltage input power supply circuit 11 via the AC-DC converter 11a including a capacitor 31, the primary side circuit 32, the transformer 33, and the secondary side circuit 34. The AC-DC converter 11a is a power factor correction circuit disposed when input from the outside of the control unit CU is produced by an alternating-current power supply.

The output from the control unit CU is sent out to the battery units BU by the power line L1. For example, the battery units BUa, BUb, BUc, . . . are respectively connected to output terminals Te1, Te2, Te3, . . . via diodes D1, D2, D3, . . . for preventing a reverse current.

The feedforward control system provided to the high voltage input power supply circuit 11 will be described in the following.

A voltage obtained by multiplying the input voltage to the high voltage input power supply circuit 11 by kc (kc: about one divided by a few tens to one hundred) is input to the non-inverting input terminal of the operational amplifier 35. Meanwhile, a voltage obtained by multiplying a fixed voltage $Vt_0$ set in advance by kc is input to the inverting input terminal c1 of the operational amplifier 35. The voltage (kc×$Vt_0$) input to the inverting input terminal c1 of the operational amplifier 35 is applied from the D/A converting section 16, for example. The value of the voltage $Vt_0$ is for example retained in a built-in memory of the D/A converting section 16. The value of the voltage $Vt_0$ can be changed as required. The value of the voltage $Vt_0$ may also be retained in the memory 15 connected to the CPU 13 and transferred to the D/A converting section 16 via the bus 14.

The output terminal of the operational amplifier 35 is connected to the base of the transistor 36. The transistor 36 performs voltage-current conversion according to a difference between the input voltage to the non-inverting input terminal of the operational amplifier 35 and the input voltage to the inverting input terminal of the operational amplifier 35.

The resistance value of the resistance Rc2 connected to the emitter of the transistor 36 is higher than the resistance value of the resistance Rc1 connected in parallel with the resistance Rc2.

Suppose for example that the input voltage to the high voltage input power supply circuit 11 is sufficiently higher than the fixed voltage $Vt_0$ set in advance. At this time, the transistor 36 is on, and the value of the combined resistance of the resistance Rc1 and the resistance Rc2 is lower than the resistance value of the resistance Rc1. Therefore the potential of point f shown in FIG. 4 approaches a ground potential.

Then, the input voltage to the control terminal provided to the driver of the primary side circuit 32 connected via a photocoupler 37 is lowered. Detecting a decrease in the input voltage to the control terminal, the DC-DC converter 11b raises the output voltage from the high voltage input power supply circuit 11 so that the input voltage to the control terminal is constant.

Conversely, suppose for example that the terminal voltage of the solar battery connected to the control unit CU is lowered, and that the input voltage to the high voltage input power supply circuit 11 approaches the fixed voltage $Vt_0$ set in advance.

When the input voltage to the high voltage input power supply circuit 11 is lowered, the state of the transistor 36 approaches an off state from an on state. As the state of the transistor 36 approaches the off state from the on state, current flows through the resistance Rc1 and the resistance Rc2 less easily, and the potential of point f shown in FIG. 4 rises.

Then, the input voltage to the control terminal provided to the driver of the primary side circuit 32 is not held constant. The DC-DC converter 11b therefore lowers the output voltage from the high voltage input power supply circuit 11 so that the input voltage to the control terminal is constant.

That is, when the input voltage is sufficiently higher than the fixed voltage $Vt_0$ set in advance, the high voltage input power supply circuit 11 raises the output voltage. When the terminal voltage of the solar battery is lowered, and the input voltage approaches the fixed voltage $Vt_0$ set in advance, the high voltage input power supply circuit 11 lowers the output voltage. Thus, the control unit CU including the high voltage input power supply circuit 11 dynamically changes the output voltage according to the magnitude of the input voltage.

Further, as will be described in the following, the high voltage input power supply circuit 11 dynamically changes the output voltage in response to changes in the voltage needed on the output side of the control unit CU.

Suppose for example that the number of battery units BU electrically connected to the control unit CU is increased during the power generation of the solar battery. That is, suppose that a load as viewed from the solar battery is increased during the power generation of the solar battery.

In this case, because a new battery unit BU is electrically connected to the control unit CU, the terminal voltage of the solar battery connected to the control unit CU is lowered. Then, as the input voltage to the high voltage input power supply circuit 11 is lowered, the state of the transistor 36 approaches the off state from the on state, and the output voltage from the high voltage input power supply circuit 11 is lowered.

On the other hand, supposing for example that the number of battery units BU electrically connected to the control unit CU is decreased during the power generation of the solar battery, the load as viewed from the solar battery is reduced, and therefore the terminal voltage of the solar battery connected to the control unit CU rises. When the input voltage to the high voltage input power supply circuit 11 becomes sufficiently higher than the fixed voltage $Vt_0$ set in advance, the input voltage to the control terminal provided to the driver of the primary side circuit 32 is lowered, and the output voltage from the high voltage input power supply circuit 11 is raised.

Incidentally, the resistance values of the resistances Rc1, Rc2, and Rc3 are selected appropriately such that the value of the output voltage from the high voltage input power supply circuit 11 is a voltage value within a range set in advance. That is, an upper limit to the output voltage from the high voltage input power supply circuit 11 is determined by the resistance values of the resistances Rc1 and Rc2. The transistor 36 is disposed to prevent the value of the output voltage from the high voltage input power supply circuit 11 from exceeding the upper limit voltage value set in advance when the input voltage to the high voltage input power supply circuit 11 exceeds a predetermined value.

On the other hand, a lower limit to the output voltage from the high voltage input power supply circuit 11 is determined by the input voltage to the inverting input terminal of an operational amplifier of a feedforward control system in the charger circuit 41a, as will be described later.

[Internal Configuration of Battery Unit]

FIG. 5 shows an example of an internal configuration of a battery unit BU. The following description will be made by taking the battery unit BUa as an example. Unless otherwise specified, the battery unit BUb and the battery unit BUc have a similar configuration to that of the battery unit BUa.

The battery unit BUa includes the charger circuit 41a, the discharger circuit 42a, and the battery Ba. The voltage V12 is supplied from the control unit CU to the charger circuit 41a. The voltage V13 as output from the battery unit BUa is supplied to the control unit CU via the discharger circuit 42a. The voltage V13 may also be supplied directly from the discharger circuit 42a to the external device.

The charger circuit 41a includes a DC-DC converter 43a. The DC-DC converter 43a converts the voltage V12 input to the charger circuit 41a to a predetermined voltage. The converted predetermined voltage is supplied to the battery Ba to charge the battery Ba. The predetermined voltage differs according to the type of the battery Ba or the like. A voltage sensor 43b, an electronic switch 43c, and a current sensor 43d are connected to the input stage of the DC-DC converter 43a. A current sensor 43e, an electronic switch 43f, and a voltage sensor 43g are connected to the output stage of the DC-DC converter 43a.

The discharger circuit 42a includes a DC-DC converter 44a. The DC-DC converter 44a converts the DC voltage supplied from the battery Ba to the discharger circuit 42a to the voltage V13. The converted voltage V13 is output from the discharger circuit 42a. A voltage sensor 44b, an electronic switch 44c, and a current sensor 44d are connected to the input stage of the DC-DC converter 44a. A current sensor 44e, an electronic switch 44f, and a voltage sensor 44g are connected to the output stage of the DC-DC converter 44a.

The battery unit BUa includes a CPU 45. The CPU 45 controls various parts of the battery unit BU. The CPU 45 for example performs on/off control of the electronic switches. The CPU 45 may also perform a process of ensuring the safety of the battery B, such as an overcharge preventing function, an overcurrent preventing function, and the like. The CPU 45 is connected to a bus 46. The bus 46 is an $I^2C$ bus, for example.

The bus 46 is connected with a memory 47, an A/D converting section 48, and a temperature sensor 49. The memory 47 is for example a rewritable nonvolatile memory such as an EEPROM or the like. The A/D converting section 48 for example converts analog sensor information obtained by the voltage sensors and the current sensors to digital information. The sensor information converted to a digital signal by the A/D converting section 48 is supplied to the CPU 45. The temperature sensor 49 measures temperatures at predetermined positions within the battery unit BU. The temperature sensor 49 for example measures a temperature on the periphery of a board mounted with the CPU 45, the temperatures of the charger circuit 41a and the discharger circuit 42a, and the temperature of the battery Ba.

[Power Supply System of Battery Unit]

Figure 6:
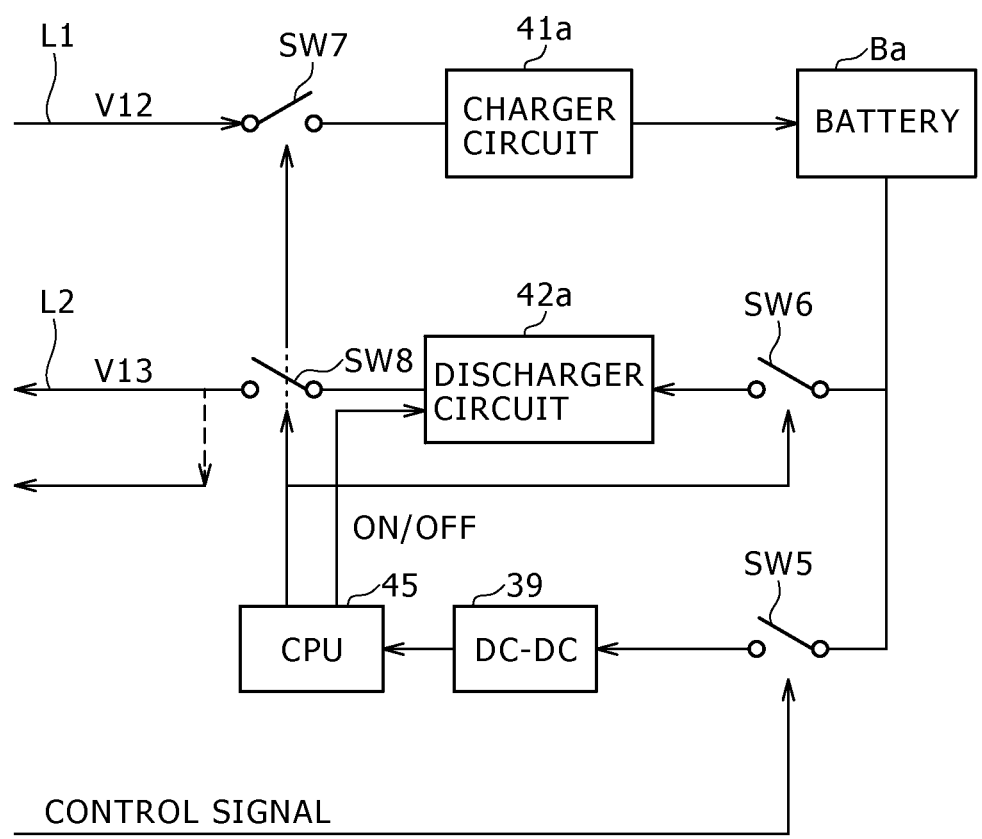
FIG. 6 is a block diagram showing an example of configuration of a power supply system of the battery unit.

FIG. 6 shows an example of a configuration of the battery unit BUa which configuration relates mainly to a power supply system. The battery unit BUa is not provided with a main switch. A switch SW5 and a DC-DC converter 39 are connected between the battery Ba and the CPU 45. A switch SW6 is connected between the battery Ba and the discharger circuit 42a. A switch SW7 is connected to the input stage of the charger circuit 41a. A switch SW8 is connected to the output stage of the discharger circuit 42a. Each of the switches SW is for example formed by a FET.

The battery unit BUa is for example activated by a control signal from the control unit CU. The control signal at a high level, for example, is supplied from the control unit CU via a predetermined signal line at all times. Therefore, the control signal at the high level is supplied to the switch SW5 and the switch SW5 is turned on by merely connecting a port of the battery unit BUa to the predetermined signal line. When the switch SW5 is turned on, the battery unit BUa is activated. When the switch SW5 is turned on, a DC voltage from the battery Ba is supplied to the DC-DC converter 39. The DC-DC converter 39 generates a power supply voltage for operating the CPU 45. The generated power supply voltage is supplied to the CPU 45, so that the CPU 45 operates.

The CPU 45 performs control according to an instruction from the control unit CU. A control signal as an instruction for charging, for example, is supplied from the control unit CU to the CPU 45. According to the instruction for charging, the CPU 45 turns off the switch SW6 and the switch SW8 and then turns on the switch SW7. When the switch SW7 is turned on, the voltage V12 supplied from the control unit CU is supplied to the charger circuit 41*a*. The charger circuit 41*a* converts the voltage V12 to a predetermined voltage. The battery Ba is charged by the converted predetermined voltage. Incidentally, a method of charging the battery Ba can be changed as appropriate according to the type of the battery Ba.

A control signal as an instruction for discharging, for example, is supplied from the control unit CU to the CPU 45. According to the instruction for discharging, the CPU 45 turns off the switch SW7, and turns on the switch SW6 and the switch SW8. For example, the CPU 45 turns on the switch SW8 after a certain time from the turning on of the switch SW6. When the switch SW6 is turned on, the DC voltage from the battery Ba is supplied to the discharger circuit 42*a*. The discharger circuit 42*a* converts the DC voltage from the battery Ba to the voltage V13. The converted voltage V13 is supplied to the control unit CU via the switch SW8. Incidentally, though omitted in the present example, a diode may be added to a stage subsequent to the switch SW8 so as to prevent collision with the output of another battery unit BU.

Incidentally, the discharger circuit 42*a* can be switched on/off by the control of the CPU 45 (ON/OFF signal line drawn from the CPU 45 to the discharger circuit 42*a* in the figure). For example, a switch SW not shown in the figure (which switch will be referred to as a switch SW10 in consideration of the convenience of description) is provided on the output side of the switch SW6. The switch SW10 switches between a first path passing through the discharger circuit 42*a* and a second path not passing through the discharger circuit 42*a*.

When the discharger circuit 42*a* is turned on, the CPU 45 connects the switch SW10 to the first path. The output from the switch SW6 is thereby supplied to the switch SW8 via the discharger circuit 42*a*. When the discharger circuit 42*a* is to be turned off, the CPU 45 connects the switch SW10 to the second path. The output from the switch SW6 is thereby supplied directly to the switch SW8 without being passed through the discharger circuit 42*a*.

[Example of Configuration of Charger Circuit]

Figure 7:
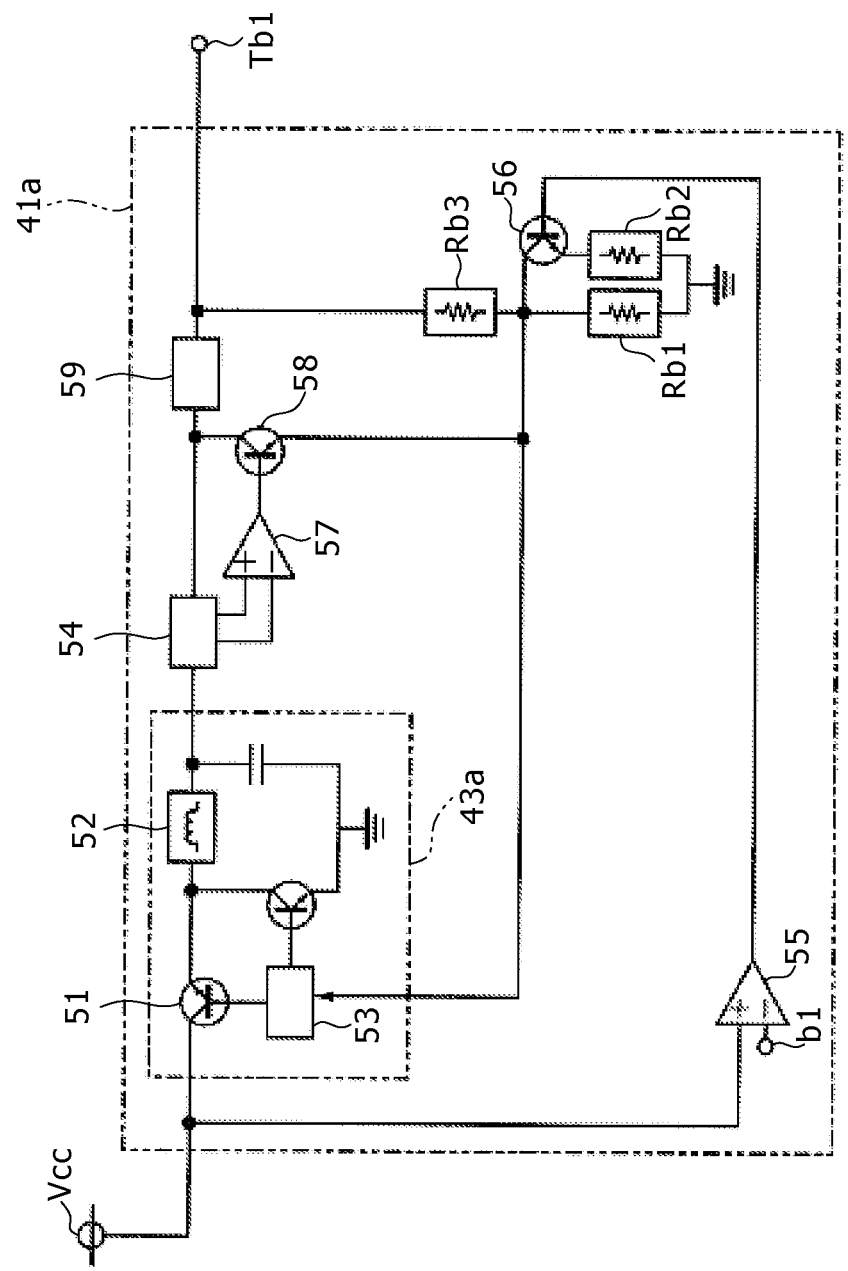
FIG. 7 shows a concrete example of a configuration of a charger circuit in the battery unit.

FIG. 7 shows a concrete example of a configuration of a charger circuit in a battery unit. As shown in FIG. 7, the charger circuit 41*a* includes a DC-DC converter 43*a* and a feedforward control system and a feedback control system to be described later. Incidentally, FIG. 7 does not show the voltage sensor 43*b*, the electronic switch 43*c*, the current sensor 43*d*, the current sensor 43*e*, the electronic switch 43*f*, the voltage sensor 43*g*, the switch SW7, or the like.

The charger circuit in each of the battery units BU has a substantially similar configuration to the configuration of the charger circuit 41*a* shown in FIG. 7.

The DC-DC converter 43*a* includes for example a transistor 51, a coil 52, a control IC (Integrated Circuit) 53, and the like. The transistor 51 is controlled by the control IC 53.

As in the high voltage input power supply circuit 11, the feedforward control system includes an operational amplifier 55, a transistor 56, and resistances Rb1, Rb2, and Rb3. The output of the feedforward control system is for example input to a control terminal provided to the control IC 53 in the DC-DC converter 43*a*. The control IC 53 in the DC-DC converter 43*a* adjusts the output voltage from the charger circuit 41*a* such that the input voltage to the control terminal is constant.

That is, the feedforward control system provided to the charger circuit 41*a* acts in a similar manner to the feedforward control system provided to the high voltage input power supply circuit 11.

Because the charger circuit 41*a* has the feedforward control system, the value of the output voltage from the charger circuit 41*a* is adjusted to be a voltage value within a range set in advance. Because the value of the output voltage from the charger circuit is adjusted to be a voltage value within the range set in advance, a current for charging the battery B electrically connected to the control unit CU is adjusted according to changes in the input voltage from the high voltage input power supply circuit 11. The battery units BU including the charger circuit thus have functions of charging devices that change the rates of charging of the respective batteries B.

Because the rates of charging of the respective batteries B electrically connected to the control unit CU are changed, the value of the input voltage to the charger circuits of the respective battery units BU (which value may be said to be the value of the output voltage from the high voltage input power supply circuit 11 or the low voltage input power supply circuit 12) is adjusted to be a voltage value within a range set in advance.

The input to the charger circuit 41*a* is for example the output from the high voltage input power supply circuit 11 or the low voltage input power supply circuit 12 of the control unit CU described above. Therefore, for example, one of the terminals Te1, Te2, Te3, . . . shown in FIG. 4 and the input terminal of the charger circuit 41*a* are connected to each other.

As shown in FIG. 7, the output voltage is extracted from the charger circuit 41*a* via the DC-DC converter 43*a*, a current sensor 54, and a filter 59. The battery Ba is connected to the terminal Tb1 of the charger circuit 41*a*. That is, the output from the charger circuit 41*a* is the input to the battery Ba.

As will be described later, the values of the output voltages from the respective charger circuits are adjusted to be a voltage value within a range set in advance according to the types of the batteries connected to the respective charger circuits. The range of the output voltage from each of the charger circuits is adjusted by selecting the resistance values of the resistances Rb1, Rb2, and Rb3 appropriately.

Because the range of the output voltage from each charger circuit is thus determined individually according to the type of the battery connected to the charger circuit, the type of the battery B provided to the battery unit BU is not specifically limited. This is because it suffices to select the resistance values of the resistances Rb1, Rb2, and Rb3 within each charger circuit appropriately according to the type of the connected battery B.

Incidentally, while FIG. 7 illustrates a configuration in which the output of the feedforward control system is input to the control terminal of the control IC 53, the CPU 45 of the battery unit BU may supply an input to the control terminal of the control IC 53. For example, the CPU 45 of the battery unit BU may obtain information on the input voltage to the battery unit BU from the CPU 13 of the control unit CU via the signal line SL. The CPU 13 of the control unit CU can obtain information on the input voltage to the battery unit BU from results of measurement of the voltage sensor 11*h*, the voltage sensor 12*g*, and the like.

The feedforward control system provided to the charger circuit 41*a* will be described in the following.

An input to the non-inverting input terminal of the operational amplifier 55 is a voltage obtained by multiplying the input voltage to the charger circuit 41a by kb (kb: about one divided by a few tens to one hundred). On the other hand, an input to the inverting input terminal b1 of the operational amplifier 55 is a voltage obtained by multiplying a voltage Vb to be set as a lower limit of the output voltage from the high voltage input power supply circuit 11 or the low voltage input power supply circuit 12 by kb. The voltage (kb×Vb) input to the inverting input terminal b1 of the operational amplifier 55 is for example applied from the CPU 45.

Therefore, when the input voltage to the charger circuit 41a is sufficiently higher than the fixed voltage Vb set in advance, the feedforward control system provided to the charger circuit 41a raises the output voltage from the charger circuit 41a. In addition, when the input voltage to the charger circuit 41a approaches the fixed voltage Vb set in advance, the feedforward control system lowers the output voltage from the charger circuit 41a.

As with the transistor 36 shown in FIG. 4, the transistor 56 is disposed to prevent the value of the output voltage from the charger circuit 41a from exceeding an upper limit set in advance when the input voltage to the charger circuit 41a exceeds a predetermined value. Incidentally, the range of the value of the output voltage from the charger circuit 41a is determined by a combination of the resistance values of the resistances Rb1, Rb2, and Rb3. The resistance values of the resistances Rb1, Rb2, and Rb3 are therefore adjusted according to the type of the battery B connected to each charger circuit.

As described above, the charger circuit 41a also includes a feedback control system. The feedback control system includes for example the current sensor 54, an operational amplifier 57, a transistor 58, and the like.

When an amount of current supplied to the battery Ba exceeds a specified value set in advance, the feedback control system lowers the output voltage from the charger circuit 41a to limit the amount of current supplied to the battery Ba. A degree of limitation of the amount of current supplied to the battery Ba by the feedback control system is determined according to the rating of the battery B connected to each charger circuit.

When the feedforward control system or the feedback control system lowers the output voltage from the charger circuit 41a, the amount of current supplied to the battery Ba is limited. Limiting the amount of current supplied to the battery Ba results in a decrease of charging of the battery Ba connected to the charger circuit 41a.

Next, by taking MPPT control and control by a voltage following method as an example, description will be made of the respective control systems of MPPT control and control by the voltage following method in order to facilitate the understanding of an embodiment of the present disclosure.

[MPPT Control]

An outline of MPPT control will first be described in the following.

Figure 8A:
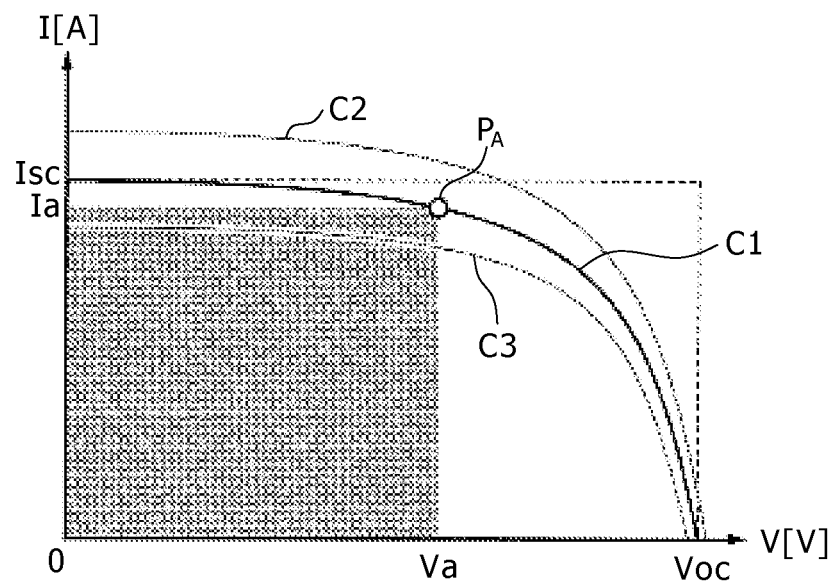
FIG. 8A is a graph showing the voltage-current characteristics of a solar battery.

FIG. 8A is a graph showing the voltage-current characteristics of a solar battery. In FIG. 8A, an axis of ordinates indicates the terminal current of the solar battery, and an axis of abscissas indicates the terminal voltage of the solar battery. In FIG. 8A, Isc denotes an output current when the terminals of the solar battery are short-circuited during light irradiation, and Voc denotes an output voltage when the terminals of the solar battery are opened during light irradiation. Isc and Voc are referred to as a short-circuit current and an open-circuit voltage, respectively.

As shown in FIG. 8A, the terminal current of the solar battery is at a maximum when the terminals of the solar battery are short-circuited during light irradiation. At this time, the terminal voltage of the solar battery is substantially 0 V. On the other hand, the terminal voltage of the solar battery is at a maximum when the terminals of the solar battery are opened during light irradiation. At this time, the terminal current of the solar battery is substantially 0 A.

Now suppose that the graph showing the voltage-current characteristics of the solar battery is represented by a curve C1 shown in FIG. 8A. Supposing that a load is connected to the solar battery, a voltage and a current extracted from the solar battery are determined by a power consumption needed by the connected load. A point on the curve C1 which point is expressed by a set of the terminal voltage and the terminal current of the solar battery at this time is referred to as an operating point of the solar battery. Incidentally, FIG. 8A schematically shows the position of the operating point, and does not show the position of an actual operating point. The same is true for operating points in other diagrams of the present disclosure.

When the operating point is changed on the curve representing the voltage-current characteristics of the solar battery, a product of a terminal voltage and a terminal current, that is, a set of a terminal voltage Va and a terminal current Ia that maximize generated power is found. A point represented by the set of the terminal voltage Va and the terminal current Ia that maximize power obtained by the solar battery is referred to as an optimum operating point of the solar battery.

When the graph showing the voltage-current characteristics of the solar battery is represented by the curve C1 shown in FIG. 8A, the maximum power obtained from the solar battery is obtained by a product of Va and Ia giving the optimum operating point. That is, when the graph showing the voltage-current characteristics of the solar battery is represented by the curve C1 shown in FIG. 8A, the maximum power obtained from the solar battery is represented by the area (Va×Ia) of a hatched region in FIG. 8A. Incidentally, an amount obtained by dividing (Va×Ia) by (Voc×Isc) is a fill factor.

The optimum operating point changes according to the power needed by the load connected to the solar battery. A point $P_A$ representing the optimum operating point moves on the curve C1 according to changes in the power needed by the load connected to the solar battery. When the load needs a small amount of power, a current smaller than the terminal current at the optimum operating point suffices for current supply to the load. The value of the terminal voltage of the solar battery at this time is therefore higher than the voltage value at the optimum operating point. On the other hand, when the load needs a larger amount of power than an amount of power that can be supplied at the optimum operating point, the amount of power needed by the load exceeds the power that can be supplied with an illuminance at this point in time, and thus the terminal voltage of the solar battery is considered to be lowered to zero.

Curves C2 and C3 shown in FIG. 8A represent for example the voltage-current characteristics of the solar battery when the illuminance on the solar battery is changed. For example, the curve C2 shown in FIG. 8A corresponds to the voltage-current characteristics when the illuminance on the solar battery is increased, and the curve C3 shown in FIG. 8A corresponds to the voltage-current characteristics when the illuminance on the solar battery is decreased.

Supposing for example that the illuminance on the solar battery is increased, and that the curve representing the voltage-current characteristics of the solar battery changes from the curve C1 to the curve C2, the optimum operating point also changes as the illuminance on the solar battery is increased. Incidentally, at this time, the optimum operating point moves from a point on the curve C1 to a point on the curve C2.

MPPT control is none other than obtaining the optimum operating point in response to changes in the curve representing the voltage-current characteristics of the solar battery and controlling the terminal voltage (or the terminal current) of the solar battery so as to maximize the power obtained from the solar battery.

Figure 8B:
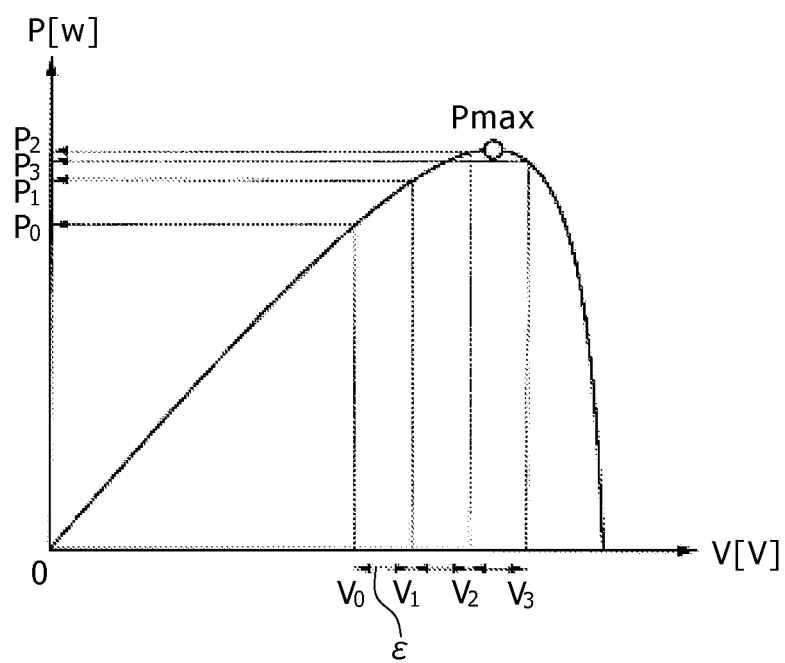
FIG. 8B is a graph (P-V curve) showing relation between the terminal voltage of the solar battery and the power generated by the solar battery when the voltage-current characteristics of the solar battery are represented by a certain curve.

FIG. 8B is a graph (P-V curve) showing relation between the terminal voltage of the solar battery and the power generated by the solar battery when the voltage-current characteristics of the solar battery are represented by a certain curve.

As shown in FIG. 8B, supposing that the power generated by the solar battery assumes a maximum value Pmax at a terminal voltage giving a maximum operating point, the terminal voltage giving the maximum operating point can be obtained by a method referred to as a hill climbing method. A series of procedures to be described in the following is generally performed by the CPU of a power conditioner connected between the solar battery and a power system, and the like.

For example, the initial value of the input voltage from the solar battery is set to $V_0$, and generated power $P_0$ at this time is calculated. Next, a setting is made such that $V_1=V_0+\epsilon$ (where $\epsilon>0$), and the input voltage from the solar battery is increased by $\epsilon$. Next, with the input voltage from the solar battery set at $V_1$, generated power $P_1$ at this time is calculated. Next, $P_0$ and $P_1$ obtained are compared with each other. When $P_1>P_0$, a setting is made such that $V_2=V_1+\epsilon$, and the input voltage from the solar battery is increased by $\epsilon$. Next, with the input voltage from the solar battery set at $V_2$, generated power $P_2$ at this time is calculated. Next, $P_1$ and $P_2$ obtained are compared with each other. When $P_2>P_1$, a setting is made such that $V_3=V_2+\epsilon$, and the input voltage from the solar battery is increased by $\epsilon$. Next, with the input voltage from the solar battery set at $V_3$, generated power $P_3$ at this time is calculated.

Supposing that $P_3<P_2$ at this time, the terminal voltage giving the maximum operating point is between $V_2$ and $V_3$. Thus, the terminal voltage giving the maximum operating point can be obtained with a predetermined accuracy by adjusting the magnitude of $\epsilon$. A bisection algorithm (bisection method algorithm) may be applied to the above-described procedures. Incidentally, a simple hill climbing method cannot deal with two or more peaks of the P-V curve when a partial shadow is formed on the light irradiated surface of the solar battery, for example, thus requiring a device in a control program.

MPPT control adjusts the terminal voltage such that the load as viewed from the solar battery is optimum all the time and can therefore extract maximum power from the solar battery under each of weather conditions. On the other hand, the calculation of the terminal voltage giving the maximum operating point needs analog/digital conversion (A/D conversion), and the calculation includes multiplication, so that control takes time. MPPT control may thus be unable to deal with sharp changes in the illuminance on the solar battery when the sky starts to become cloudy suddenly and the illuminance on the solar battery changes sharply, for example.

[Control by Voltage Following Method]

A comparison between the curves C1 to C3 shown in FIG. 8A shows that changes in the open-circuit voltage Voc which changes correspond to changes in the illuminance on the solar battery (which changes in the illuminance on the solar battery may be said to be changes in the curve representing the voltage-current characteristics) are small as compared with changes in the short-circuit current Isc. It is also known that any of solar batteries exhibits very similar voltage-current characteristics and that the terminal voltage giving the maximum operating point in a case of a crystalline silicon solar battery is in the vicinity of about 80% of the open-circuit voltage. Thus, when an appropriate voltage value is set as the terminal voltage of the solar battery, and the output current of a converter is adjusted such that the terminal voltage of the solar battery is the set voltage value, power is expected to be extracted from the solar battery efficiently. Control by such current limitation is referred to as a voltage following method.

An outline of control by the voltage following method will be described in the following. Suppose as a premise that a switching element is disposed between the solar battery and the power conditioner, and that voltage measuring means is disposed between the solar battery and the switching element. In addition, suppose that the solar battery is in a state of being irradiated with light.

First, the switching element is turned off, and the voltage measuring means measures the terminal voltage of the solar battery when a predetermined time has passed from the turning off of the switching element. Waiting for passing the predetermined time from the turning off of the switching element to the measurement of the terminal voltage of the solar battery is to wait for the terminal voltage of the solar battery to become stable. The terminal voltage at this time is the open-circuit voltage Voc.

Next, a voltage value of for example 80% of the open-circuit voltage Voc obtained by the measurement is calculated as a target voltage value, and the target voltage value is temporarily retained in a memory or the like. Next, the switching element is turned on, and a current starts to be passed through a converter within the power conditioner. At this time, the output current of the converter is adjusted so that the terminal voltage of the solar battery becomes the target voltage value. The above-described series of procedures is performed at arbitrary time intervals.

As compared with MPPT control, control by the voltage following method increases a loss of power obtained by the solar battery, but can be achieved with a simple circuit and is at a low cost, so that an inexpensive power conditioner including a converter can be used.

Figure 9A:
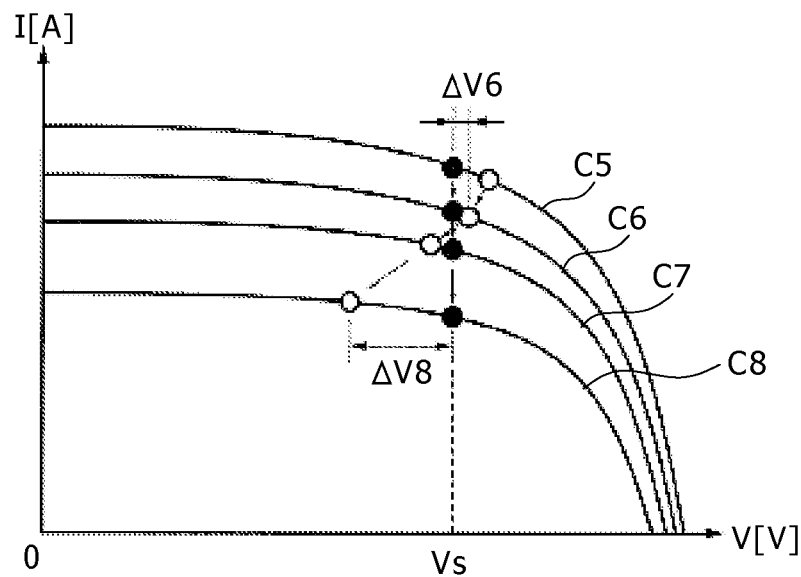
FIG. 9A is a diagram of assistance in explaining changes in operating point in response to changes in the curve representing the voltage-current characteristics of the solar battery.

FIG. 9A is a diagram of assistance in explaining changes in operating point in response to changes in the curve representing the voltage-current characteristics of the solar battery. In FIG. 9A, an axis of ordinates indicates the terminal current of the solar battery, and an axis of abscissas indicates the terminal voltage of the solar battery. In addition, white circles in FIG. 9A represent operating points when MPPT control is performed, and black circles in FIG. 9A represent operating points when control by the voltage following method is performed.

Now suppose that the curve representing the voltage-current characteristics of the solar battery is a curve C5. Next supposing that the curve representing the voltage-current characteristics of the solar battery changes from the curve C5 to C8 in order as the illuminance on the solar battery is changed, operating points according to the respective control systems also change as the curve representing the voltage-current characteristics of the solar battery changes. Incidentally, because of small changes in the open-circuit voltage Voc in response to changes in the illuminance on the solar battery, the target voltage value when control by the voltage following method is performed is regarded as a substantially constant value Vs in FIG. 9A.

As is understood from FIG. 9A, when the curve representing the voltage-current characteristics of the solar battery is a curve C6, there is a small degree of deviation between the operating point of MPPT control and the operating point of control by the voltage following method. It is therefore considered that when the curve representing the voltage-current characteristics of the solar battery is the curve C6, each control does not greatly differ in generated power obtained by the solar battery.

On the other hand, when the curve representing the voltage-current characteristics of the solar battery is the curve C8, there is a large degree of deviation between the operating point of MPPT control and the operating point of control by the voltage following method. For example, as shown in FIG. 9A, a comparison between differences $\Delta V6$ and $\Delta V8$ between the terminal voltage when MPPT control is applied and the terminal voltage when control by the voltage following method is applied shows that $\Delta V6 < \Delta V8$. Therefore, when the curve representing the voltage-current characteristics of the solar battery is the curve C8, there is a great difference between generated power obtained from the solar battery when MPPT control is applied and generated power obtained from the solar battery when control by the voltage following method is applied.

[Cooperative Control between Control Unit and Battery Units]

An outline of cooperative control between the control unit and the battery units will next be described. Control by cooperation (interlocking) between the control unit and the battery units will hereinafter be referred to as cooperative control as appropriate.

Figure 9B:
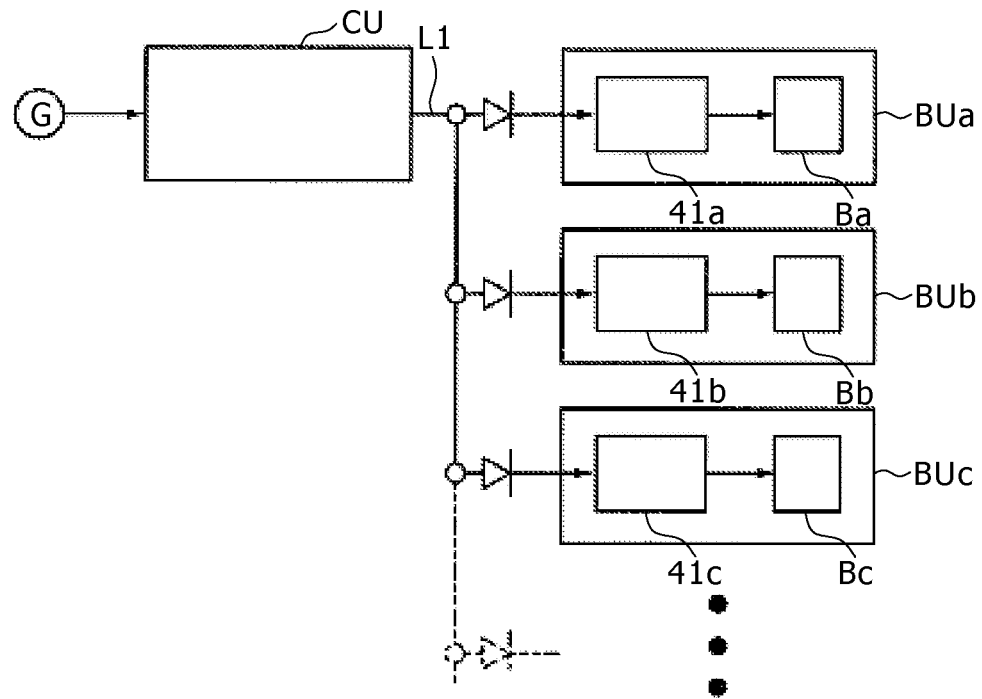
FIG. 9B is a block diagram showing an example of configuration of a control system in which cooperative control is performed by a control unit and a plurality of battery units.

FIG. 9B is a block diagram showing an example of configuration of a control system in which cooperative control is performed by the control unit and a plurality of battery units.

As shown in FIG. 9B, for example, the control unit CU is connected with one or a plurality of battery units BU including a set of a charger circuit and a battery. As shown in FIG. 9B, the one or plurality of battery units BU are connected in parallel to the power line L1. Incidentally, FIG. 9B illustrates a case of one control unit CU. However, in a case where the control system includes a plurality of control units CU, the one or plurality of control units CU are similarly connected in parallel to the power line L1.

In general, when a single battery is to be charged by the power obtained from the solar battery, MPPT control or control by the voltage following method described above is performed by a power conditioner interposed between the solar battery and the battery. The single battery includes a battery containing a plurality of batteries and operating as an integral whole. However, though including a plurality of batteries, the single battery is generally of a single type. In other words, it is assumed that MPPT control or control by the voltage following method described above is performed by the power conditioner singly, the power conditioner being connected between the solar battery and the single battery. There is no change in the number and configuration (mode of connection such as a parallel connection, a series connection, or the like) of batteries as objects of charging during charging, and the number and configuration of batteries as objects of charging during charging are generally fixed.

On the other hand, in cooperative control, the control unit CU and the plurality of battery units BUa, BUb, BUc, . . . each perform control autonomously so as to strike a balance between the output voltage of the control unit CU and the voltage needed by the plurality of battery units BU. As described above, the batteries B contained in the battery units BUa, BUb, BUc, . . . may be of any type. That is, the control unit CU according to the present disclosure can perform cooperative control on a plurality of types of batteries B.

Further, in the configuration example shown in FIG. 9B, each of the battery units BU is detachable, and the number of battery units BU connected to the control unit CU can be changed during the power generation of the solar battery. In the configuration example shown in FIG. 9B, the load as viewed from the solar battery can also be changed during the power generation of the solar battery. However, cooperative control can deal with not only changes in the illuminance on the solar battery but also changes in the load as viewed from the solar battery during the power generation of the solar battery. This is one of major features not found in conventional configurations.

The control system that dynamically changes charging rates according to a capacity for supply from the control unit CU can be constructed by connecting the control unit CU and the battery units BU described above to each other. An example of cooperative control will be described in the following. Incidentally, the following description will be made by taking as an example a control system in which one battery unit BUa is connected to the control unit CU in an initial state. However, the following description similarly applies to a case where a plurality of battery units BU are connected to the control unit CU.

Suppose for example that the solar battery is connected to the input side of the control unit CU and that the battery unit BUa is connected to the output side of the control unit CU. In addition, suppose for example that an upper limit of the output voltage of the solar battery is 100 V, and that a lower limit of the output voltage of the solar battery is desired to be restricted to 75 V. That is, suppose that a setting is made such that $Vt_0=75$ V, and that the input voltage to the inverting input terminal of the operational amplifier 35 is $(kc \times 75)$ V.

In addition, suppose that an upper limit and a lower limit of the output voltage from the control unit CU are for example set at 48 V and 45 V, respectively. That is, suppose that a setting is made such that Vb=45 V, and that the input voltage to the inverting input terminal of the operational amplifier 55 is $(kb \times 45)$ V. Incidentally, the value of 48 V as the upper limit of the output voltage from the control unit CU is adjusted by selecting the resistances Rc1 and Rc2 within the high voltage input power supply circuit 11 appropriately. In other words, suppose that the target voltage value of the output from the control unit CU is set at 48 V.

Further, suppose that an upper limit and a lower limit of the output voltage from the charger circuit 41a in the battery unit BUa are for example set at 42 V and 28 V, respectively. The resistances Rb1, Rb2, and Rb3 within the charger circuit 41a are selected such that the upper limit and the lower limit of the output voltage from the charger circuit 41a are 42 V and 28 V, respectively.

Incidentally, a case of the input voltage to the charger circuit 41a being at the upper limit corresponds to a state of the rate of charging of the battery Ba being 100%, and a case of the input voltage to the charger circuit 41a being at the lower limit corresponds to a state of the rate of charging of the battery Ba being 0%. That is, a case of the input voltage to the charger circuit 41a being 48 V corresponds to the state of the rate of charging of the battery Ba being 100%, and a case of the input voltage to the charger circuit 41a being 45 V corresponds to the state of the rate of charging of the battery Ba being 0%. The charging rate is set in a range of 0% to 100% depending on the input voltage varying in the range of 45 V to 48 V.

Incidentally, separately from cooperative control, the rate of charging of the battery may be controlled in parallel. That is, because constant-current charging is performed in an initial stage of charging, a charging voltage is adjusted so that a charging current can be maintained at a certain level or lower by subjecting the output from the charger circuit 41a to feedback adjustment, and the charging voltage is maintained at a certain level or lower in a final stage. In this case, the adjusted charging voltage is equal to or lower than the voltage adjusted in the above-described cooperative control. A charging process is thereby performed within the power supplied from the control unit CU.

Description will first be made of changes in operating point when cooperative control is performed in a case where the illuminance on the solar battery is changed.

Figure 10A:
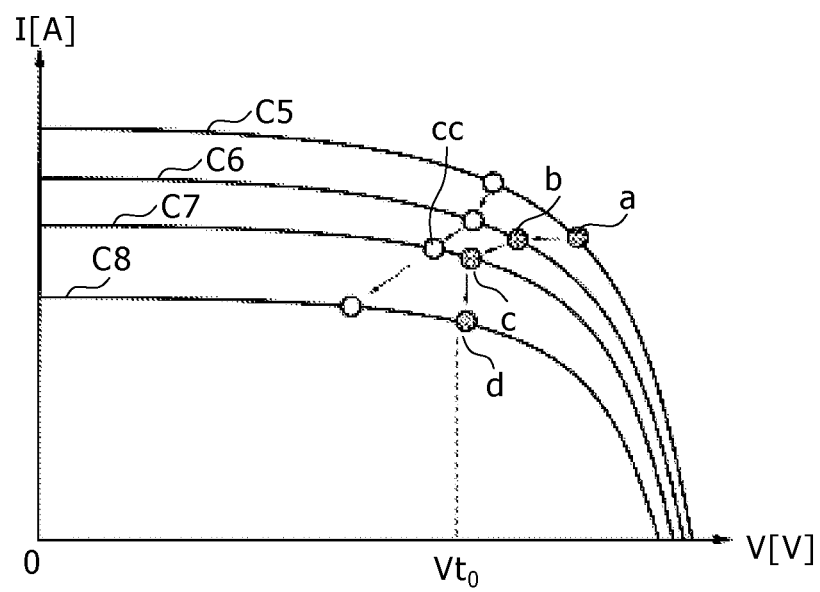
FIG. 10A is a diagram of assistance in explaining changes in operating point when cooperative control is performed in a case where illuminance on the solar battery is decreased.

FIG. 10A is a diagram of assistance in explaining changes in operating point when cooperative control is performed in a case where the illuminance on the solar battery is decreased. In FIG. 10A, an axis of ordinates indicates the terminal current of the solar battery, and an axis of abscissas indicates the terminal voltage of the solar battery. White circles in FIG. 10A represent operating points when MPPT control is performed, and hatched circles in FIG. 10A represent operating points when cooperative control is performed. Curves C5 to C8 shown in FIG. 10A represent the voltage-current characteristics of the solar battery when the illuminance on the solar battery is changed.

Now suppose that the power needed by the battery Ba is 100 w (watts), and that the voltage-current characteristics of the solar battery are represented by the curve C5 (sunniest state). Suppose that the operating point of the solar battery at this time is for example represented by point a on the curve C5, and that the power (amount of supply) supplied from the solar battery to the battery Ba via the high voltage input power supply circuit 11 and the charger circuit 41a exceeds the power (amount of demand) needed by the battery Ba.

When the power supplied from the solar battery to the battery Ba exceeds the power needed by the battery Ba, the output voltage (voltage V12) from the control unit CU to the battery unit BUa is the upper limit of 48 V. That is, because the input voltage to the battery unit BUa is the upper limit of 48 V, the output voltage from the charger circuit 41a in the battery unit BUa is set to the upper limit of 42 V, and the battery Ba is charged at the charging rate of 100%. Incidentally, a power as a surplus amount is for example discarded as heat or the like. Incidentally, while the battery is charged at 100% in the above description, the charging of the battery is not limited to 100%, but the charging rate can be adjusted as appropriate according to the characteristics of the battery.

When the sky starts to become cloudy from this state, the curve representing the voltage-current characteristics of the solar battery changes from the curve C5 to the curve C6. Because the sky starts to become cloudy, the terminal voltage of the solar battery degreases gradually, and the output voltage from the control unit CU to the battery unit BUa also decreases gradually. Thus, as the curve representing the voltage-current characteristics of the solar battery changes from the curve C5 to the curve C6, the operating point of the solar battery for example moves to point b on the curve C6.

When the sky starts to become cloudier, the curve representing the voltage-current characteristics of the solar battery changes from the curve C6 to the curve C7 and the terminal voltage of the solar battery gradually decreases, and correspondingly the output voltage from the control unit CU to the battery unit BUa also decreases. When the output voltage from the control unit CU to the battery unit BUa has decreased to a certain degree, the control system becomes unable to supply 100% power to the battery Ba.

In this case, when the terminal voltage of the solar battery approaches $Vt_0=75$ V as the lower limit from 100 V, the high voltage input power supply circuit 11 in the control unit CU starts to lower the output voltage to the battery unit BUa from 48 V to Vb=45 V.

When the output voltage from the control unit CU to the battery unit BUa is lowered, the input voltage to the battery unit BUa is lowered. The charger circuit 41a in the battery unit BUa therefore starts to lower the output voltage to the battery Ba. When the output voltage from the charger circuit 41a is lowered, the charging current supplied to the battery Ba is decreased, and the charging of the battery Ba connected to the charger circuit 41a is decreased in speed. That is, the rate of charging of the battery Ba is lowered.

When the rate of charging of the battery Ba is lowered, power consumption is decreased, so that the load as viewed from the solar battery is reduced. Then, the terminal voltage of the solar battery rises (recovers) by an amount corresponding to the reduction in the load as viewed from the solar battery.

When the terminal voltage of the solar battery rises, a degree of lowering of the output voltage from the control unit CU to the battery unit BUa is decreased, and the input voltage to the battery unit BUa rises. Because the input voltage to the battery unit BUa rises, the charger circuit 41a in the battery unit BUa raises the output voltage from the charger circuit 41a, and raises the rate of charging of the battery Ba.

When the rate of charging of the battery Ba is raised, the load as viewed from the solar battery is increased, and the terminal voltage of the solar battery is lowered by an amount corresponding to the increase in the load as viewed from the solar battery. When the terminal voltage of the solar battery is lowered, the high voltage input power supply circuit 11 in the control unit CU lowers the output voltage to the battery unit BUa.

The adjustment of the charging rate as described above is thereafter repeated automatically until the output voltage from the control unit CU to the battery unit BUa converges to a certain value and a balance between the amount of demand of power and the amount of supply of power is struck.

Unlike MPPT control, cooperative control is not control by software. Cooperative control therefore does not need the calculation of the terminal voltage giving the maximum operating point. In addition, calculation by a CPU is not involved in the adjustment of the charging rate by cooperative control. Therefore, cooperative control reduces power consumption as compared with MPPT control, and adjusts the charging rate described above in a short time of a few nanoseconds to a few hundred nanoseconds.

In addition, the high voltage input power supply circuit 11 and the charger circuit 41a only sense the magnitudes of the voltages input to the high voltage input power supply circuit 11 and the charger circuit 41a themselves and adjust the output voltages, thus eliminating a need for analog/digital conversion and eliminating a need for communication between the control unit CU and the battery unit BUa. Hence, cooperative control does not need a complex circuit, and a circuit for realizing cooperative control is a small circuit.

In this case, suppose that the control unit CU was able to supply a power of 100 w at point a on the curve C5, and suppose that the output voltage from the control unit CU to the battery unit BUa has converged to a certain value. That is, suppose that the operating point of the solar battery for example has moved to point c on the curve C7. At this time, the power supplied to the battery Ba is less than 100 w. However, as shown in FIG. 10A, depending on how the value of the voltage $Vt_0$ is selected, comparable power as compared with the case where MPPT control is performed can be supplied to the battery Ba.

When the sky starts to become even cloudier, the curve representing the voltage-current characteristics of the solar battery changes from the curve C7 to the curve C8, and the operating point of the solar battery for example moves to point d on the curve C8.

As shown in FIG. 10A, under cooperative control, the balance between the amount of demand of power and the amount of supply of power is adjusted, and therefore the terminal voltage of the solar battery does not fall below the voltage $Vt_0$. That is, under cooperative control, the terminal voltage of the solar battery does not fall below the voltage $Vt_0$ even when the illuminance on the solar battery becomes extremely low.

When the illuminance on the solar battery becomes extremely low, the terminal voltage of the solar battery becomes a value close to the voltage $Vt_0$, and a very small amount of current is supplied to the battery Ba. Thus, when the illuminance on the solar battery becomes extremely low, the charging of the battery Ba takes time, but the control system does not go down because the balance between the amount of demand of power and the amount of supply of power in the control system is struck.

As described above, cooperative control adjusts the charging rate in a very short time. Thus, according to cooperative control, the control system can be prevented from going down even when the sky starts to become cloudy suddenly and the illuminance on the solar battery decreases sharply.

Description will next be made of changes in operating point when cooperative control is performed in a case where the load as viewed from the solar battery is changed.

Figure 10B:
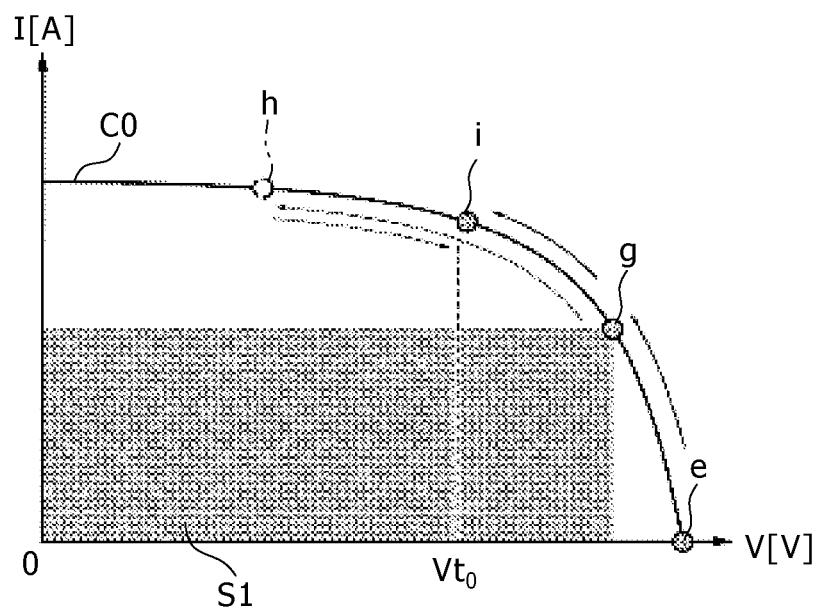
FIG. 10B is a diagram of assistance in explaining changes in operating point when cooperative control is performed in a case where a load as viewed from the solar battery is increased.

FIG. 10B is a diagram of assistance in explaining changes in operating point when cooperative control is performed in a case where the load as viewed from the solar battery is increased. In FIG. 10B, an axis of ordinates indicates the terminal current of the solar battery, and an axis of abscissas indicates the terminal voltage of the solar battery. In addition, hatched circles in FIG. 10B represent operating points when cooperative control is performed.

Now suppose that the illuminance on the solar battery is not changed, and that the voltage-current characteristics of the solar battery are represented by a curve C0 shown in FIG. 10B.

Immediately after the activation of the control system, there is considered to be substantially no power consumption within the control system, and therefore the terminal voltage of the solar battery may be considered to be substantially equal to the open-circuit voltage. Thus, the operating point of the solar battery immediately after the activation of the control system may be considered to be for example point e on the curve C0. Incidentally, the output voltage from the control unit CU to the battery unit BUa at this time may be considered to be the upper limit of 48 V.

When the supply of power to the battery Ba connected to the battery unit BUa is started, the operating point of the solar battery for example moves to point g on the curve C0.

Incidentally, in the description of the present example, power needed by the battery Ba is 100 w, and therefore the area of a hatched region S1 in FIG. 10B is equal to 100 w.

The state of the control system when the operating point of the solar battery is point g on the curve C0 is a state in which the power supplied from the solar battery to the battery Ba via the high voltage input power supply circuit 11 and the charger circuit 41a exceeds the power needed by the battery Ba. Thus, the terminal voltage of the solar battery, the output voltage from the control unit CU, and the voltage supplied to the battery Ba when the operating point of the solar battery is point g on the curve C0 are 100 V, 48 V, and 42 V, respectively.

Suppose in this case that the battery unit BUb having a similar configuration to that of the battery unit BUa is newly connected to the control unit CU. Supposing that the battery Bb connected to the battery unit BUb needs a power of 100 w for charging as with the battery Ba connected to the battery unit BUa, power consumption increases, and the load as viewed from the solar battery increases sharply.

To supply a total power of 200 w to the two batteries requires for example doubling of a sum of output current while maintaining the output voltages from the charger circuit 41a in the battery unit BUa and the charger circuit 41b in the battery unit BUb.

However, in the case where a power generating device is the solar battery, the terminal voltage of the solar battery is lowered as the output currents from the charger circuits 41a and 41b increase. Thus, the sum of the output current needs to be more than doubled as compared with the time when the operating point of the solar battery is point g. Then, as shown in FIG. 10B, the operating point of the solar battery needs to be for example point h on the curve C0, so that the terminal voltage of the solar battery becomes extremely low. An extremely low terminal voltage of the solar battery may cause the control system to go down.

Cooperative control adjusts the balance between the amount of demand of power and the amount of supply of power in the control system when the terminal voltage of the solar battery is lowered by connecting the battery unit BUb anew. Specifically, the rates of charging of the battery Ba and the battery Bb are lowered automatically such that a total power supplied to the two batteries is for example 150 w.

Specifically, when the terminal voltage of the solar battery is lowered by connecting the battery unit BUb anew, the voltages output to the battery unit BUa and the battery unit BUb from the control unit CU are also lowered. When the terminal voltage of the solar battery approaches $Vt_0=75$ V as the lower limit from 100 V, the high voltage input power supply circuit 11 in the control unit CU starts to lower the voltages output to the battery units BUa and BUb from 48 V to Vb=45 V.

When the output voltages from the control unit CU to the battery units BUa and BUb are lowered, the voltages input to the battery units BUa and BUb are lowered.

Then, the charger circuit 41a in the battery unit BUa and the charger circuit 41b in the battery unit BUb start to lower the voltages output to the batteries Ba and Bb, respectively. When the output voltages from the charger circuits are lowered, the charging of the batteries connected to the charger circuits is decreased in speed. That is, the rates of charging of the respective batteries are lowered.

When the rates of charging of the respective batteries are lowered, total power consumption is decreased. Thus, the load as viewed from the solar battery is reduced, and the terminal voltage of the solar battery rises (recovers) by an amount corresponding to the reduction in the load as viewed from the solar battery.

Thereafter, as in the case where the illuminance on the solar battery decreases sharply, the charging rates are adjusted until the output voltages from the control unit CU to the battery units BUa and BUb converge to a certain value and the balance between the amount of demand of power and the amount of supply of power is struck.

Incidentally, the voltage value to which actual convergence is achieved differs depending on conditions. Thus, the voltage value to which the actual convergence is achieved is not clearly known. However, because charging is not performed when the terminal voltage of the solar battery becomes $Vt_0=75$ V as the lower limit, it is assumed that the convergence is achieved at a voltage slightly higher than the value of $Vt_0$ as the lower limit. In addition, because each battery unit is not subjected to interlocked control, it is assumed that the charging rates differ from each other depending on variations in elements used even when each battery unit have the same configuration. However, the fact remains that the cooperative control of the whole can be performed as a result.

Cooperative control adjusts the charging rates in a very short time. Thus, when the battery unit BUb is newly connected, the operating point of the solar battery moves from point g to point i on the curve C0. Incidentally, while FIG. 10B shows point h as an example of the operating point of the solar battery on the curve C0 for the convenience of description, the operating point of the solar battery does not actually move to point h under cooperative control.

Thus, under cooperative control, in response to an increase in the load as viewed from the solar battery, the charger circuits of the individual battery units BU sense the magnitudes of the voltages input to the charger circuits and the charger circuits of the individual battery units BU automatically suppress amounts of current drawn in by the charger circuits. According to cooperative control, the control system can be prevented from going down even when the number of battery units BU connected to the control unit CU is increased and the load as viewed from the solar battery increases sharply.

Description will next be made of changes in operating point when cooperative control is performed in a case where both of the illuminance on the solar battery and the load as viewed from the solar battery change.

Figure 11:
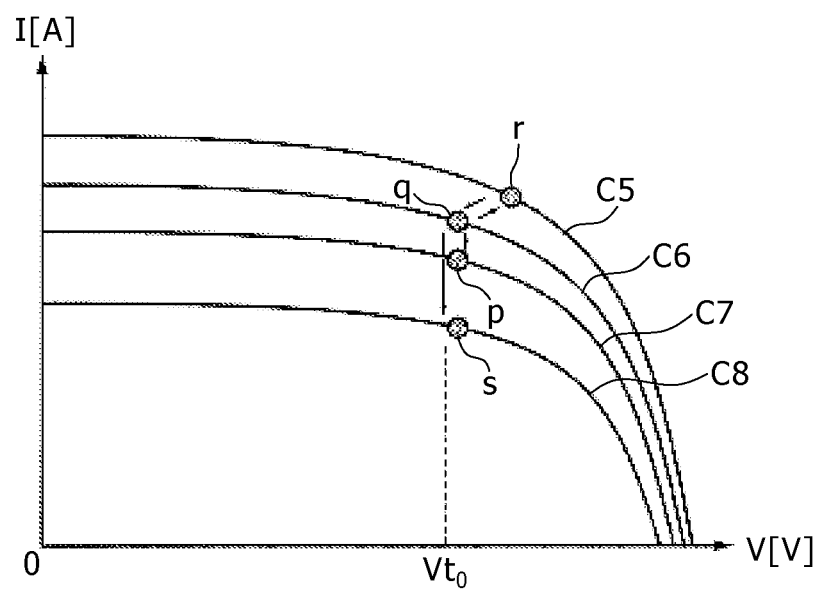
FIG. 11 is a diagram of assistance in explaining changes in operating point when cooperative control is performed in a case where both of the illuminance on the solar battery and the load as viewed from the solar battery change.

FIG. 11 is a diagram of assistance in explaining changes in operating point when cooperative control is performed in a case where both of the illuminance on the solar battery and the load as viewed from the solar battery change. In FIG. 11, an axis of ordinates indicates the terminal current of the solar battery, and an axis of abscissas indicates the terminal voltage of the solar battery. Hatched circles in FIG. 11 represent operating points when cooperative control is performed. Curves C5 to C8 shown in FIG. 11 represent the voltage-current characteristics of the solar battery when the illuminance on the solar battery is changed.

First, suppose that the battery unit BUa including the battery Ba that needs a power of 100 w for charging is connected to the control unit CU. In addition, suppose that the voltage-current characteristics of the solar battery at this time are represented by the curve C7, and that the operating point of the solar battery is represented by point p on the curve C7.

Suppose that as shown in FIG. 11, the terminal voltage of the solar battery at point p is rather close to the voltage $Vt_0$ set in advance as the lower limit of the output voltage of the solar battery. The terminal voltage of the solar battery being rather close to the voltage $Vt_0$ means that the control system has adjusted the charging rate by cooperative control and has greatly lowered the charging rate. That is, a state of the operating point of the solar battery being represented by point p shown in FIG. 11 indicates that the power to be supplied to the battery Ba via the charger circuit 41a greatly exceeds the power supplied from the solar battery to the high voltage input power supply circuit 11. Thus, in the state of the operating point of the solar battery being represented by point p shown in FIG. 11, the charging rate is adjusted to a large degree, and a power considerably lower than 100 w is supplied to the charger circuit 41a charging the battery Ba.

Next suppose that the illuminance on the solar battery increases, and that the curve representing the voltage-current characteristics of the solar battery changes from the curve C7 to the curve C6. In addition, suppose that the battery unit BUb having a similar configuration to that of the battery unit BUa is newly connected to the control unit CU. At this time, the operating point of the solar battery for example moves from point p on the curve C7 to point q on the curve C6.

Because the two battery units are connected to the control unit CU, power to be consumed when the charger circuits 41a and 41b fully charge the batteries Ba and Bb is 200 w. However, when the illuminance on the solar battery is not sufficient, cooperative control is continued, and power consumption is adjusted to less than 200 w (for example 150 w or the like).

Next suppose that the curve representing the voltage-current characteristics of the solar battery moves from the curve C6 to the curve C5 as the sky clears up, for example. At this time, when the power generated by the solar battery increases with an increase in the illuminance on the solar battery, the output current from the solar battery increases.

When the illuminance on the solar battery increases sufficiently, and the power generated by the solar battery increases further, the terminal voltage of the solar battery becomes a sufficiently higher value than the voltage $Vt_0$ at a certain point. When the power supplied from the solar battery to the two batteries via the high voltage input power supply circuit 11 and the charger circuits 41a and 41b exceeds the power needed to charge the two batteries, the adjustment of the charging rates by cooperative control is eased, or cancelled automatically.

At this time, the operating point of the solar battery is for example represented by point r on the curve C5, and the individual batteries Ba and Bb are charged at a charging rate of 100%.

Next suppose that the illuminance on the solar battery decreases, and that the curve representing the voltage-current characteristics of the solar battery changes from the curve C5 to the curve C6.

Then, when the terminal voltage of the solar battery decreases, and the terminal voltage of the solar battery approaches the voltage $Vt_0$ set in advance, the adjustment of the charging rates by cooperative control is performed again. The operating point of the solar battery at this time is represented by point q on the curve C6.

Next suppose that the illuminance on the solar battery decreases further, and that the curve representing the voltage-current characteristics of the solar battery moves from the curve C6 to the curve C8.

Then, the charging rates are adjusted such that the terminal voltage of the solar battery does not fall below the voltage $Vt_0$. Thus, the terminal current from the solar battery decreases, and the operating point of the solar battery moves from point q on the curve C6 to point s on the curve C8.

Cooperative control adjusts the balance between the amount of demand of power and the amount of supply of power between the control unit CU and the individual battery units BU such that the input voltage to the individual battery units BU does not fall below the voltage $Vt_0$ set in advance. Therefore, cooperative control can change the rates of charging of the individual batteries B in real time according to a capacity for supply on the input side as viewed from the individual battery units BU. Thus, cooperative control can deal with not only changes in the illuminance on the solar battery but also changes in the load as viewed from the solar battery.

As described above, the present disclosure does not require a commercial power supply. The present disclosure is therefore effective also in regions not provided with power supply devices or power networks.

2. Example of Modification

One embodiment of the present disclosure has been described above. However, the present disclosure is not limited to the above-described embodiment, but is susceptible of various modifications. Configurations, numerical values, materials, and the like in the embodiment are all an example, and are not limited to the configurations and the like that have been illustrated. The configurations and the like that have been illustrated can be changed as appropriate insofar as no technical contradiction arises.

The control unit and the battery units in the control system may be made portable. The above-described control system may be for example applied to automobiles, houses, and the like.

In one embodiment, a control system includes: a first device configured to receive a first voltage, and convert the first voltage to a second voltage that varies according to a variation of the received first voltage; and a second device configured to receive the second voltage and to change a charging rate of an energy storage device according to a variation of the received second voltage. In an embodiment, the first device is a control unit configured to combine and convert a plurality of first voltages received from a plurality of different power generation apparatuses into the second voltage. In an embodiment, the control system further includes a plurality of second devices that are battery units, the plurality of battery units being connected to the first device. In an embodiment, the control system further includes a plurality of the first devices configured to receive a plurality of respective first voltages, the plurality of first devices including a high voltage input power supply circuit and a low voltage input power supply circuit, wherein each of the high voltage input power supply circuit and the low voltage input power supply circuit are configured to convert the respective first voltages to second voltages that vary according to a variation of the respective first voltages. In an embodiment, the second device is configured to receive a combination of the plurality of second voltages, and change the charging rate of the energy storage device according to a variation of the received combination of second voltages. In an embodiment, the second device is a battery unit including a charger circuit configured to receive the second voltage, a battery as the energy storage device, and a discharger circuit connected to the battery. In an embodiment, the first device is a control unit including: a battery configured to be charged by the second voltage; a processor configured to communicate with the second device and to output a control signal for activation and discharging of the energy storage device; and a main switch configured to enable a supply of power from the battery to the processor when the main switch is in an on state. In an embodiment, the control unit further includes a second switch configured to enable a third voltage to be supplied from the energy storage device to the control unit when the second switch is in an on state, and a third switch connected to the second switch and configured to supply a fourth voltage that is based on a the third voltage to an external device when the third switch is in an on state.

In another embodiment, a method of charging an energy storage device is provided. The method includes: receiving a first voltage; converting the first voltage to a second voltage that varies according to a variation of the received first voltage; changing a charging rate of an energy storage device according to a variation of the received second voltage. In an embodiment, the method further includes combining and converting a plurality of first voltages received from a plurality of different power generation apparatuses into the second voltage. In an embodiment, the method further includes: receiving a plurality of respective first voltages from at least a high voltage input power supply circuit and a low voltage input power supply circuit; and converting the respective first voltages to second voltages that vary according to a variation of the respective first voltages. In an embodiment, the method further includes receiving a combination of the plurality of second voltages, and changing the charging rate of the energy storage devices according to a variation of the received combination of second voltages. In an embodiment, the method further includes changing charging rates of a plurality of different energy storage devices based on cooperative control between a control unit that outputs the second voltage and the plurality of energy storage devices, said cooperative control based in part on varying power needs of the different energy storage devices.

In another embodiment, a charging unit is provided and includes: a device configured to receive a voltage, and to change a charging rate of an energy storage device according to a variation of the received voltage supplied to the device. In an embodiment, the device is configured to receive the voltage from a control unit that is connected to a plurality of different power generation apparatuses. In an embodiment, the charging unit further includes a plurality of devices that are battery units. In an embodiment, the device is a battery unit including a charger circuit configured to receive the voltage, a battery connected to the charger circuit, and a discharger circuit connected to the battery. In an embodiment, the device is a battery unit including: a battery configured to be charged by at least a portion of the voltage; a processor; and a first switch connected between the battery and the processor and configured to enable a supply of power from the battery to the processor when the first switch is in an on state, the first switch being operable upon a control signal received from a control unit. In an embodiment, the control unit further includes: a discharger circuit; a second switch connected between the battery and the discharger circuit; a charger circuit connected between the battery and a third switch; and a fourth switch connected to the discharger circuit, wherein the processor is configured to, upon receipt of a charging control signal from the control unit, turn off the second and the fourth switches and then turn on the third switch, thereby enabling a supply of the voltage to the battery, and wherein the processor is configured to, upon receipt of a discharging control signal from the control unit, turn off the third switch thereby disabling charging of the battery, and then turn on the second and fourth switches, thereby enabling a discharge of the voltage from the battery through the discharge circuit.

In another embodiment, a method of charging an energy storage device is provided. The method includes: receiving a voltage; and changing a charging rate of the energy storage device according to a variation of the received voltage. In an embodiment, the method further includes receiving a combination of a plurality of voltages, and changing the charging rate of the energy storage devices according to a variation of the received combination of voltages. In an embodiment, changing the charging rate is further based on power needs of the energy storage device. In an embodiment, the method further includes changing charging rates of a plurality of different energy storage devices based on cooperative control between a control unit that outputs the voltage and the plurality of energy storage devices, said cooperative control based in part on varying power needs of the different energy storage devices.

In another embodiment, an electric vehicle is provided and includes: a first control system including a first device configured to receive a first voltage, and convert the first voltage to a second voltage that varies according to a variation of the received first voltage, and a second device configured to receive the second voltage and to change a charging rate of an energy storage device according to a variation of the received second voltage. The electric vehicle also includes a conversion apparatus that converts power supplied from the energy storage device into a form usable by a component of the electric vehicle, and a second control system configured to process information relating to vehicle control on the basis of information relating to the energy storage device.

In another embodiment, an electric vehicle is provided and includes: a charging unit including a device configured to receive a voltage, and to change a charging rate of an energy storage device according to a variation of the received voltage supplied to the device; a conversion apparatus that converts power supplied from the energy storage device into a form usable by a component of the electric vehicle; and a second control system configured to process information relating to vehicle control on the basis of information relating to the energy storage device.

Incidentally, the present disclosure can also adopt the following constitutions.

(1) A control system including:
a first device supplied with a first voltage from a power generating section, and generating a second voltage according to variation in the first voltage; and
a second device supplied with the second voltage from the first device, and changing a rate of charging of a battery according to variation in the second voltage.

(2) The control system according to (1),
wherein the first device lowers the second voltage according as the first voltage is lowered.

(3) The control system according to (1) or (2),
wherein the second device decreases the charging rate according as the second voltage is lowered.

(4) The control system according to any one of (1) to (3),
wherein the second voltage is supplied via a power line.

(5) The control system according to (4),
wherein the second device obtains the second voltage in the power line.

(6) The control system according to any one of (1) to (5),
wherein the power generating section generates power according to an environment.

(7) The control system according to any one of (1) to (6),
wherein the control system includes a plurality of first devices and a plurality of second devices.

(8) A control device connected to a device supplied with a first voltage from a power generating section and generating a second voltage according to variation in the first voltage,
wherein the second voltage is supplied from the device, and
a rate of charging of a battery is changed according to variation in the second voltage.

(9) A control method including:
supplying a first voltage from a power generating section to a first device;
generating a second voltage according to variation in the first voltage by the first device;
supplying the second voltage from the first device to a second device; and
changing a rate of charging of a battery according to variation in the second voltage by the second device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

EXPLANATION OF REFERENCE SYMBOLS

1 . . . Control system
11 . . . High voltage input power supply circuit
12 . . . Low voltage input power supply circuit
41*a* . . . Charger circuit
Ba . . . Battery
CU . . . Control unit
BU . . . Battery unit
V10 (V11) . . . First voltage
V12 . . . Second voltage

The invention claimed is:

1. A control system comprising:
a first device configured to receive a first voltage, and convert the first voltage to a second voltage that varies according to a variation of the received first voltage, wherein the first device includes a first DC-DC converter and the second voltage is in a predetermined voltage range having an upper limit voltage value; and
a second device configured to receive the second voltage and to change a charging rate of an energy storage device when the second voltage is lower than the upper limit voltage value, wherein the second device includes a second DC-DC converter, and
wherein the second device is configured to supply power to the first device through a power line.

2. The control system according to claim 1, wherein the first device is a control unit configured to combine and convert a plurality of first voltages received from a plurality of different power generation apparatuses into the second voltage.

3. The control system according to claim 1, further comprising a plurality of second devices that are battery units, the plurality of battery units being connected to the first device.

4. The control system according to claim 1, further comprising a plurality of the first devices configured to receive a plurality of respective first voltages, the plurality of first devices including a high voltage input power supply circuit and a low voltage input power supply circuit,
wherein each of the high voltage input power supply circuit and the low voltage input power supply circuit are configured to convert the respective first voltages to second voltages that vary according to a variation of the respective first voltages.

5. The control system according to claim 4, wherein the second device is configured to receive a combination of the plurality of second voltages, and change the charging rate of the energy storage device according to a variation of the received combination of second voltages.

6. The control system according to claim 1, wherein the second device is a battery unit including a charger circuit configured to receive the second voltage, a battery as the energy storage device, and a discharger circuit connected to the battery.

7. The control system according to claim 1, wherein the first device is a control unit including:
a battery configured to be charged by the second voltage;
a processor configured to communicate with the second device and to output a control signal for activation and discharging of the energy storage device; and
a main switch configured to enable a supply of power from the battery to the processor when the main switch is in an on state.

8. The control system according to claim 7, wherein the control unit further includes a second switch configured to enable a third voltage to be supplied from the energy storage device to the control unit when the second switch is in an on state, and
a third switch connected to the second switch and configured to supply a fourth voltage that is based on a the third voltage to an external device when the third switch is in an on state.

9. A charging unit comprising:
a device configured to receive a voltage from a control unit, the device includes a first DC-DC converter and the control unit includes a second DC-DC converter,
wherein the voltage from the control unit is in a predetermined voltage range having an upper limit voltage value,
wherein the device is configured to change a charging rate of an energy storage device when the voltage is lower than the upper limit voltage value, and
wherein the device is configured to supply power to the control unit through a power line.

10. The charging unit according to claim 9, wherein the device is configured to receive the voltage from the control unit that is connected to a plurality of different power generation apparatuses.

11. The charging unit according to claim 9, further comprising a plurality of devices that are battery units.

12. The charging unit according to claim 9, wherein the device is a battery unit including a charger circuit configured to receive the voltage, a battery connected to the charger circuit, and a discharger circuit connected to the battery.

13. The charging unit according to claim 9, wherein the device is a battery unit including:
a battery configured to be charged by at least a portion of the voltage;
a processor; and
a first switch connected between the battery and the processor and configured to enable a supply of power from the battery to the processor when the first switch is in an on state, the first switch being operable upon a control signal received from a control unit.

14. The charging unit according to claim 13, wherein the control unit further includes:
a discharger circuit;
a second switch connected between the battery and the discharger circuit;
a charger circuit connected between the battery and a third switch; and
a fourth switch connected to the discharger circuit,
wherein the processor is configured to, upon receipt of a charging control signal from the control unit, turn off the second and the fourth switches and then turn on the third switch, thereby enabling a supply of the voltage to the battery, and
wherein the processor is configured to, upon receipt of a discharging control signal from the control unit, turn off the third switch thereby disabling charging of the battery, and then turn on the second and fourth switches, thereby enabling a discharge of the voltage from the battery through the discharge circuit.

* * * * *